US011586637B2

(12) United States Patent
Wu et al.

(10) Patent No.: US 11,586,637 B2
(45) Date of Patent: Feb. 21, 2023

(54) SEARCH RESULT PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Yifeng Wu, Shenzhen (CN); Qiang Yan, Shenzhen (CN); Wenhao Zheng, Shenzhen (CN); Xiaoyin Chen, Shenzhen (CN); Dechuan Zhan, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 68 days.

(21) Appl. No.: 17/200,128

(22) Filed: Mar. 12, 2021

(65) Prior Publication Data
US 2021/0224286 A1   Jul. 22, 2021

Related U.S. Application Data

(63) Continuation of application No. PCT/CN2019/121928, filed on Nov. 29, 2019.

(30) Foreign Application Priority Data

Nov. 29, 2018   (CN) .......................... 201811444224.6

(51) Int. Cl.
*G06F 16/2457*   (2019.01)
*G06F 40/30*   (2020.01)
(Continued)

(52) U.S. Cl.
CPC ........ *G06F 16/24578* (2019.01); *G06F 40/30* (2020.01); *G06N 3/0454* (2013.01); *G06N 3/08* (2013.01)

(58) Field of Classification Search
None
See application file for complete search history.

(56) References Cited

U.S. PATENT DOCUMENTS 8,719,248 B2 *   5/2014   Mukhopadhyay ...... G06F 16/48
707/765
10,665,122 B1 *   5/2020   Meisner ................ G06F 40/232
(Continued)

FOREIGN PATENT DOCUMENTS

| CN | 105677795 A | 6/2016 |
|---|---|---|
| CN | 107256242 A | 10/2017 |

(Continued)

OTHER PUBLICATIONS

English translation of International Search Report dated Mar. 2, 2020 in International Application No. PCT/CN2019/121928.
(Continued)

*Primary Examiner* — Robert W Beausoliel, Jr.
*Assistant Examiner* — Cheryl M Shechtman
(74) *Attorney, Agent, or Firm* — Crowell & Moring, L.L.P.

(57) ABSTRACT

This disclosure relates to a search result processing method and apparatus, and a storage medium. The method may include acquiring a search result according to a search keyword and obtaining an accurate matching score of the search result relative to the search keyword. The method may further include determining a semantic matching weight vector of the search result, a semantic representation vector of the search keyword, and a semantic representation vector of the search result. The method may further include obtaining a semantic matching score of the search result relative to the search keyword according to the semantic representation vectors and the semantic matching weight vector. The method may further include obtaining a similarity between the search result and the search keyword (Continued)

according to the accurate matching score and the semantic matching score.

20 Claims, 12 Drawing Sheets

(51) Int. Cl.
    *G06N 3/04*     (2006.01)
    *G06N 3/08*     (2006.01)

(56) References Cited

U.S. PATENT DOCUMENTS

| | | | |
|---|---|---|---|
| 10,803,055 B2 * | 10/2020 | Sirotkovic | G06N 3/084 |
| 2005/0143971 A1 * | 6/2005 | Burstein | G06F 40/284 |
| | | | 704/4 |
| 2017/0270409 A1 * | 9/2017 | Trischler | G06F 40/30 |
| 2020/0192941 A1 * | 6/2020 | Chen | G06F 16/9538 |

FOREIGN PATENT DOCUMENTS

| | | |
|---|---|---|
| CN | 107870984 | 4/2018 |
| CN | 108073576 | 5/2018 |
| CN | 108780445 | 11/2018 |
| CN | 110162593 | 8/2019 |
| WO | 2018/157703 | 9/2018 |

OTHER PUBLICATIONS

Office Action and Search Report of Chinese application 201811444224.6 dated Sep. 16, 2022, 12 pages.

\* cited by examiner

Server 110  Internet 120  Terminal 130

SEARCH RESULT PROCESSING METHOD AND APPARATUS, AND STORAGE MEDIUM

RELATED APPLICATION

This application is a continuation application of PCT Patent Application No. PCT/CN2019/121928, filed on Nov. 29, 2019, which claims priority to Chinese Patent Application No. 201811444224.6, entitled "SEARCH RESULT PROCESSING AND SIMILARITY MODEL TRAINING METHOD AND APPARATUS" and filed with the China National Intellectual Property Administration on Nov. 29, 2018, wherein the content of each of the above-referenced applications is incorporated herein by reference in its entirety.

FIELD OF THE TECHNOLOGY

This disclosure relates to the field of computer technologies, and in particular, to a search result processing method and apparatus, a terminal, an electronic device, and a storage medium.

BACKGROUND OF THE DISCLOSURE

With the development of the Internet, a user may acquire required information through searches. However, the user has diverse search needs, and there are massive resources on the Internet. As a result, numerous search results may be found. To save time for the user and facilitate browsing, search results need to be sorted, and search results that better meet needs of the user rank in the top.

In the conventional technology, after a user inputs a search keyword, a corresponding search result list may be acquired according to the search keyword, text similarities are then calculated by using an algorithm model, sorting is performed according to similarity scores, and a search result list obtained after sorting is returned. However, in the conventional technology, algorithm models with similarity calculation are usually used for an application scenario of a single search need, for example, a general need, different search needs of a user are not considered, and the impact of text word orders and context is ignored. Search results with relatively high similarity scores do not necessarily meet needs of the user. As a result, search results that rank in the top in a search result list obtained through sorting according to similarities are not necessarily the most satisfactory or desirable results for the user.

SUMMARY

Embodiments of this disclosure provide a search result processing method and apparatus, a terminal, an electronic device, and a storage medium, to resolve the problem of inaccurate similarity calculation of a search result that cannot meet different search needs of a user in the conventional technology.

An embodiment of this disclosure provides a search result processing method performed by an electronic device. The method may include acquiring a search result according to a search keyword and obtaining an accurate matching score of the search result relative to the search keyword. The method may further include determining a semantic matching weight vector of the search result, a semantic representation vector of the search keyword, and a semantic representation vector of the search result. The method may further include obtaining a semantic matching score of the search result relative to the search keyword according to the semantic representation vectors and the semantic matching weight vector. The method may further include obtaining a similarity between the search result and the search keyword according to the accurate matching score and the semantic matching score.

Another embodiment of this disclosure provides a search result processing apparatus. The apparatus may include a memory operable to store program code and a processor operable to read the program code. The processor may be configured to acquire a search result according to a search keyword and obtain an accurate matching score of the search result relative to the search keyword. The processor may be further configured to determine a semantic matching weight vector of the search result, a semantic representation vector of the search keyword, and a semantic representation vector of the search result. The processor may be further configured to obtain a semantic matching score of the search result relative to the search keyword according to the semantic representation vectors and the semantic matching weight vector. The processor may be further configured to obtain a similarity between the search result and the search keyword according to the accurate matching score and the semantic matching score.

Another embodiment of this disclosure provides a non-transitory computer-readable storage medium having processor executable instructions stored thereon. The instructions may cause a processor to acquire a search result according to a search keyword and obtain an accurate matching score of the search result relative to the search keyword. The instructions may further cause the processor to determine a semantic matching weight vector of the search result, a semantic representation vector of the search keyword, and a semantic representation vector of the search result. The instructions may further cause the processor to obtain a semantic matching score of the search result relative to the search keyword according to the semantic representation vectors and the semantic matching weight vector. The instructions may further cause the processor to obtain a similarity between the search result and the search keyword according to the accurate matching score and the semantic matching score.

DESCRIPTION OF EMBODIMENTS

The following clearly and completely describes the technical solutions in embodiments of this disclosure with reference to the accompanying drawings in the embodiments of this disclosure. Apparently, the described embodiments are some of the embodiments of this disclosure rather than all of the embodiments. All other embodiments obtained by a person of ordinary skill in the art based on the embodiments of this disclosure without creative efforts fall within the scope of this disclosure.

Figure 1:
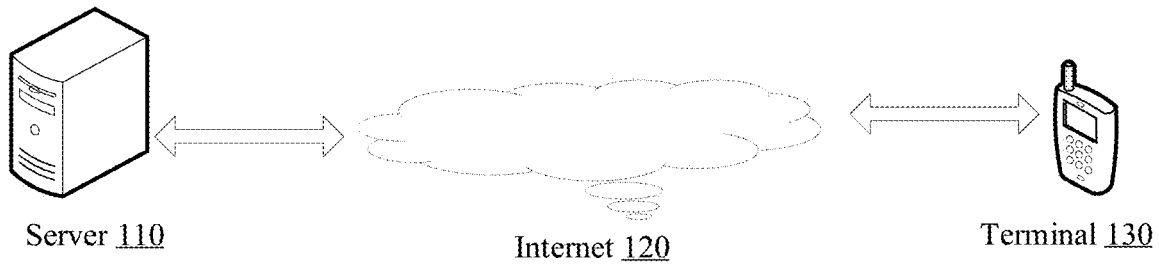
FIG. 1 is a schematic diagram of an application architecture of embodiments according to an embodiment of this disclosure.

FIG. 1 is a schematic diagram of an application architecture of embodiments according to an embodiment of this disclosure, including at least a terminal 130 and a server 110. The terminal 130 may be any smart device such as a smartphone, a tablet computer, a portable personal computer, or a smart television, various applications (APP) such as a browser and a social application capable of performing an information search may be installed and run on the terminal 130, and a user may search for required information by using the APP of the terminal 130.

The server 110 may provide the terminal 130 with various network services. For different terminals or applications on the terminal, the server 110 may be considered as a backend server providing corresponding network services. The server 110 may be one server, a server cluster formed by a plurality of servers, or a cloud computing center, which is not limited. The terminal 130 and the server 110 may be connected through the Internet 120, to communicate with each other.

In this embodiment of this disclosure, the search result processing method may be applicable to the terminal 130 or the server 110. This is not limited, and a similarity model training method may be applicable to the server 110. In addition, this embodiment of this disclosure is mainly provided for, for example, an application scenario of a vertical search. In the application scenario, a user usually has a variety of search needs, for example, but not limited to, a general need and a navigational need.

A vertical search is a professional search engine for an industry, is a subdivision and extension of a search engine, performs one-time integration on a type of special information in a library, directionally extracts required data according to fields, processes the data, and returns the processed data to a user in a form. For example, in "Search", the vertical search is specifically a search for a particular type of results, for example, an official account search or a mini program search.

For the general need, a user intends to find a target meeting a need of a type rather than a fixed target, and inputs keywords of the need to acquire results. For the navigational need, a user intends to find a fixed target without knowing an accurate name of the target, and needs to use similar keywords to make a search to acquire results.

To resolve the problem in the conventional technology that the similarity calculation and sorting of search results are inaccurate to cause a failure to meet different search needs of a user, in the embodiments provided in this embodiment of this disclosure, accurate matching and semantic matching are respectively performed on a search keyword and search results. During the accurate matching, the accurate matching is considered, and semantic information is further combined. During the semantic matching, semantic matching weight vectors of the search results are determined, to fully mine the search needs of the user, and semantic matching weight vectors are determined according to different search needs of the user to adjust the impact of the semantic matching and the accurate matching on final similarities, so that semantic matching scores are determined according to the semantic matching weight vectors, and finally, similarities of the search results are determined according to the accurate matching scores and the semantic matching scores. This is more suitable for a scenario of a variety of search needs of the user, and search results with higher similarities better meet the needs of the user, thereby improving accuracy and making search results with higher similarities better meet the needs of the user.

In this embodiment of this disclosure, a sorting operation may be alternatively performed on the terminal or the server. This is not limited. In addition, when the terminal displays search results, according to similarities, search results with similarities ranking in the top may be directly acquired and are sequentially displayed in descending order of similarity. Alternatively, sorted search results may be obtained, and the sorted search results are sequentially displayed.

A diagram of an application architecture in this embodiment of this disclosure is intended to more clearly describe the technical solutions of the embodiments of this disclosure, and does not constitute a limitation to the technical solutions provided in the embodiments of this disclosure. For other application architectures and service applications, the technical solutions provided in the embodiments of this disclosure are also applicable to similar problems.

In the embodiments of this disclosure, exemplary description is made by using an example in which the search result processing method and the similarity model training method are applicable to the diagram of the application architecture shown in FIG. 1.

Figure 2:
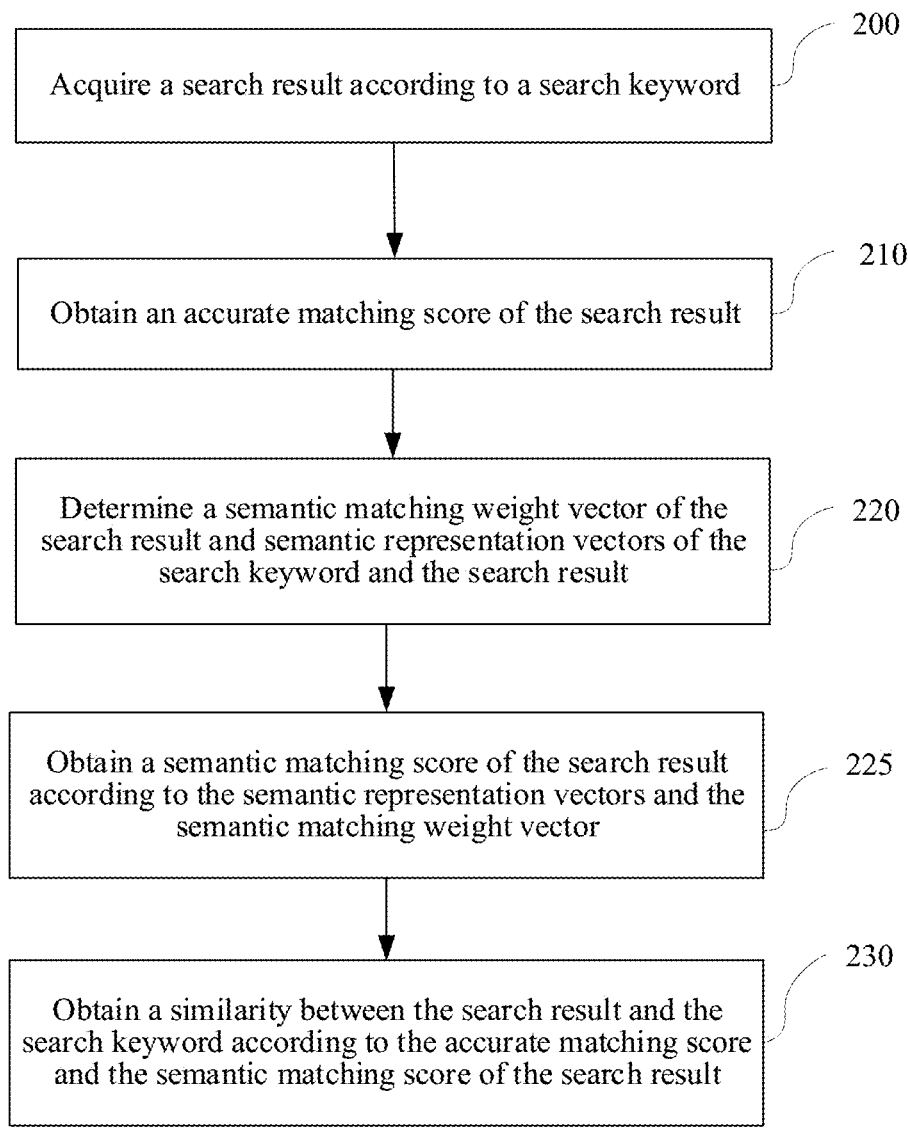
FIG. 2 is a flowchart of a search result processing method according to an embodiment of this disclosure.

FIG. 2 is a flowchart of a search result processing method according to an embodiment of this disclosure. The method includes the following steps:

Step 200. Acquire search results according to a search keyword.

Specifically, the search results may be obtained in a matching manner by performing step 200. For example, word segmentation is performed on the search keyword, matching is respectively performed based on each word segment of the search keyword, to obtain search result sets corresponding to and matching with the word segments of the search keyword, and intersection sets of the search result sets are used as the search results corresponding to the search keyword.

The following step 210 to step 230 are respectively performed for the each search result.

Step 210. Obtain an accurate matching score of the search result.

The performing step 210 specifically includes:

first, respectively obtaining word segmentation results corresponding to the search keyword and the search result using multi-granularity word segmentation.

Specifically, word segmentation is performed on the search keyword and the search result according to a preset high-frequency word set. Specifically, a high-frequency word is obtained through division when the search keyword and the search result include the high-frequency word in the preset high-frequency word set, and the remaining parts of a text are divided by word, to respectively obtain the word segmentation results corresponding to the search keyword and the search result.

For example, if "吸烟" is a high-frequency word and word segmentation results of a text "ABC 吸烟" are ["A", "B", "C", and "吸烟"], in this case, during matching, "吸烟" may be used as a whole for matching, which meets a semantic requirement, and accurate matching is performed on "A", "B" and "C" by word.

For the preset high-frequency word set, word segmentation may be first performed on data by using a word segmentation tool, word frequency is counted, and a high-frequency word is selected according to the word frequency.

In this way, in the foregoing embodiments, for features of a Chinese text, the accurate matching and semantics are comprehensively considered, and requirements of parts are met by using different word segmentation strategies, for example, using a high-frequency word and a word as granularity, that is, using multi-granularity word segmentation.

Accurate matching is then performed on the word segmentation results corresponding to the search keyword and the search result, to obtain an interaction matrix of the search keyword and the search result.

Specifically, for example, accurate matching is performed on the search keyword and one search result. Accurate matching is performed on word segments corresponding to the search keyword and word segments corresponding to the search result one by one, to obtain an interaction matrix for accurate matching. For example, an interaction matrix is M, where $M_{ij}=[q_i==d_j]$.

For example, if word segmentation results of the search keyword are ["a", "ab", "c"], and word segmentation results of the search result are ["a", "bc", "c"], accurate matching is performed on the word segments in the word segmentation result respectively. For example, accurate matching is performed on "a" of the search keyword and "a", "bc", and "c" of the search results respectively, to obtain 1, 0, and 0. Accurate matching is then performed on "ab" of the search keyword and "a", "bc", and "c" of the search results respectively, to obtain 0, 0, and 0. Finally, accurate matching is performed on "c" of the search keyword and "a", "bc", and "c" of the search results respectively, to obtain 0, 0 and 1. Finally, a 3*3 matrix M may be obtained as follows:

$$M = \begin{bmatrix} 1 & 0 & 0 \\ 0 & 0 & 0 \\ 0 & 0 & 1 \end{bmatrix}.$$

An interaction feature between the search keyword and the search result is then obtained according to a relative positional relationship between word segments in the word segmentation results corresponding to the search keyword and the search result and the interaction matrix.

That is, in this embodiment of this disclosure, after the interaction matrix is calculated, the impact of the relative positional relationship between the word segments in the word segmentation results of the search keyword and the search result is considered. In this way, it may be described more accurately whether two texts are similar.

The specific interaction feature may be calculated as:

$$MF = \frac{M \otimes M}{\text{softplus}(|D \otimes I - I \otimes D| + 1)},$$

where ($D_{ij}=|i-j|$) in D, ($I_{ij}=[i==j]$) in I, $\otimes$ represents a Kronecker product operation, and softplus is an activation function.

In this embodiment of this disclosure, if the interaction matrix M is considered as a first-order interaction matrix, the interaction feature MF may be considered as a second-order interaction matrix. Compared with the interaction matrix M, information included in the interaction feature MF carries a local language structural feature.

Finally, the accurate matching score of the search result is obtained according to the interaction feature.

Specifically: 1) The interaction feature is inputted into a pre-trained first convolutional network, to obtain a convolutional feature outputted after the first convolutional network performs feature extraction on the interaction feature.

The convolutional network is mainly used for performing feature extraction in different dimensions. For example, a convolutional neural network (CNN) is used. In this embodiment of this disclosure, the first convolutional network may be a two-dimensional convolutional network, and includes five convolutional layers, which may be specifically set according to an actual case. This is not limited in this embodiment of this disclosure. Parameters such as a convolution kernel in the first convolutional network are pre-trained, to meet a requirement of feature dimension calculation.

2) The convolutional feature corresponding to the interaction feature is inputted into the pre-trained first fully-connected network.

Specifically, the convolutional feature is flattened, and is flattened into a vector representation of the convolutional feature. The vector representation is inputted into the first fully-connected network for the fully-connected network for subsequent calculation.

3) The convolutional feature is mapped into a first preset vector space based on the first fully-connected network, to obtain a one-dimensional vector outputted by the first fully-connected network, and the outputted one-dimensional vector is used as the accurate matching score of the search result.

The fully-connected network is mainly used for transforming a spatial position. In this embodiment of this disclosure, the first fully-connected network may include three fully-connected layers, and parameters of the fully-connected layers in the first fully-connected network are pre-trained. Finally, the convolutional feature may be mapped into the one-dimensional vector, to obtain the accurate matching score.

Step 220. Determine a semantic matching weight vector of the search result and semantic representation vectors of the search keyword and the search result. Step 225. Obtain a semantic matching score of the search result according to the semantic representation vectors and the semantic matching weight vector.

When step 220 is performed, a relationship between word segments needs to examined for short text matching during the determination of a semantic matching score. To capture the significance of words, in this case, the interaction matrix is used to determine the semantic matching score.

The determining a semantic matching weight vector of the search result is specifically:

1) The interaction matrix is inputted into a pre-trained second convolutional network, to obtain a convolutional feature outputted after the second convolutional network performs feature extraction on the interaction matrix.

For example, the second convolutional network is a one-dimensional convolutional network, and includes one convolutional layer.

2) The convolutional feature is inputted into the pre-trained second fully-connected network.

For example, the second fully-connected network includes a fully-connected layer, and the semantic matching weight vector is obtained through mapping through the second fully-connected network. During specific implementation, the vector representation of the convolutional feature may be inputted into the second fully-connected network.

3) The convolutional feature is mapped into a second preset vector space based on the second fully-connected network, to obtain a preset-dimensional vector outputted by the second fully-connected network, and the outputted preset-dimensional vector is used as the semantic matching weight vector of the search result.

That is, in this embodiment of this disclosure, the interaction matrix obtained through accurate matching is introduced into a semantic matching part, to obtain the semantic matching weight vector, so that the semantic matching part can capture more appropriately parts that require attention in the text. The second convolutional network and the second fully-connected network are trained, so that the semantic matching weight vector can adjust the impact of the semantic matching score and the accurate matching score on a final similarity result according to different search needs, and both a general need and a navigational need of searches of a user are considered.

The semantic representation vectors of the search keyword and the search result are then respectively determined.

Specifically: 1) Word segmentation results corresponding to the search keyword and the search result are respectively obtained using multi-granularity word segmentation.

Specifically, word segmentation is performed on the search keyword and the search results in the same multi-granularity word segmentation manner of acquiring an accurate matching score described above.

2) A word vector of each word in the word segmentation results corresponding to the search keyword and the search result is respectively obtained according to the preset word vector model, and word representation matrices of the search keyword and the search results are respectively obtained according to the word vector of the each word in the corresponding word segmentation results.

The preset word vector model may map the each word in the word segmentation result into a vector, to obtain the word vector corresponding to the each word, so that word vectors of all the word segments in the word segmentation result form corresponding word representation matrices of the search keyword or the search result. For example, if the search keyword is divided into 15 word segments, and each word segment is mapped into a 300-dimensional word vector, a word representation matrix of the search keyword is a matrix with the size of 15*300.

During specific application, a word2vec model may be used as the foregoing word vector model. The word2vec model is a shallow and double-layer neural network. In the assumption of a bag-of-words model in word2vec, a sequence of words is not significant. After the training is completed, the word2vec model may map each word into a vector, to represent a relationship between the word segments, and the vector is a hidden layer of the neural network.

3) The word representation matrices (that is, the word representation matrix of the search keyword and the word representation matrix of the search result) are respectively inputted into a pre-trained third convolutional network, to obtain convolutional features that correspond to the word representation matrices and are outputted after the third convolutional network performs feature extraction on the word representation matrices. For example, the third convolutional network is a one-dimensional convolutional network, and includes one convolutional layer.

4) The convolutional features (for example, vector representations) corresponding to the word representation matrices are inputted into the pre-trained third fully-connected network. For example, the third fully-connected network includes two fully-connected layers.

5) The convolutional features are mapped into a third preset vector space based on the third fully-connected network, to obtain preset-dimensional vectors outputted by the third fully-connected network, and the outputted preset-dimensional vectors are respectively used as corresponding semantic representation vectors of the search keyword or the search result.

In this way, the third convolutional network and the third fully-connected network are pre-trained, to obtain the semantic representation vectors of the search keyword and the search results according to the trained third convolutional network and third fully-connected network.

Certainly, the semantic representation vectors of the text may be alternatively trained and learned in another manner, for example, in an RNN manner. Different manners may be selected according to actual requirements. This is not limited in this embodiment of this disclosure.

Finally, a semantic matching score of the search result is obtained according to the determined semantic representation vectors and the corresponding semantic matching weight vector.

Specifically: 1) The semantic representation vectors of the search keyword and the search result are concatenated, to obtain a concatenated semantic representation vector.

For example, if the semantic representation vector of the search keyword is a 32-dimensional vector, and the semantic representation vector of the search result is a 32-dimensional vector, the concatenated semantic representation vector is a 64-dimensional vector.

2) A dot product operation is performed on the concatenated semantic representation vector and the semantic matching weight vector of the search result, to obtain the semantic matching score of the search result.

Specifically, the semantic matching score is $s_2 = w \otimes f$, and $\otimes$ represents a Kronecker product operation, where w is the semantic matching weight vector, and f is the concatenated semantic representation vector.

That is, the semantic representation vector is multiplied by the corresponding semantic matching weight vector, to obtain a final semantic matching score.

Step 230. Obtain a similarity between the search result and the search keyword according to the accurate matching score and the semantic matching score of the search result.

The performing step 230 specifically includes: adding the accurate matching score and the semantic matching score, and using an added sum as the similarity between the search result and the search keyword.

For example, the similarity is $s=s_1+s_2$, where $s_1$ is the accurate matching score, and $s_2$ is the semantic matching score.

Further, in this embodiment of this disclosure, the foregoing search result processing method may be completed based on a similarity model. Specifically, a manner of acquiring the similarities between the search results and the search keyword may be: inputting the search keyword and the search results into the trained similarity model, and outputting the similarities between the search results and the search keyword after the search result processing method in the foregoing embodiments is performed by using the similarity model.

That is, the foregoing step 200 to step 230 in this embodiment of this disclosure, that is, the search result processing method, is implemented by using the similarity model. Based on the trained similarity model, the search keyword and the search result are inputted into the similarity model, and the similarity between the search keyword and the search result is outputted.

Further, after step 230 is performed, the similarities between the search results and the search keyword are obtained, so that the similarities may be applied. Specifically, a possible implementation is provided. The search results are sorted according to the similarities between the search results and the search keyword, to obtain the sorted search results.

In this way, in this embodiment of this disclosure, the impact of the semantic matching and the accurate matching on the final similarity may be adjusted by using the semantic matching weight vector. When a search query is more of a navigational query, the semantic matching weight vector is relatively low, thereby reducing the impact of the semantic matching on the final result. When the search query is more of a general need, the semantic matching weight vector is relatively high, thereby reducing the impact of the accurate matching on the final result, enabling that final similarities can meet different search needs, so that final search results that rank in the top better meet needs of a user.

Based on the foregoing embodiments, it can be learned that, in this embodiment of this disclosure, the similarities between the search results and the search keyword are obtained by creating and training the similarity model. That is, the foregoing step 200 to step 230 are implemented mainly based on the similarity model. Therefore, an algorithm of the similarity model is described below in detail by using an example of a specific application scenario, for example, a scenario of the application to an official account search in WeChat®.

Figure 3:
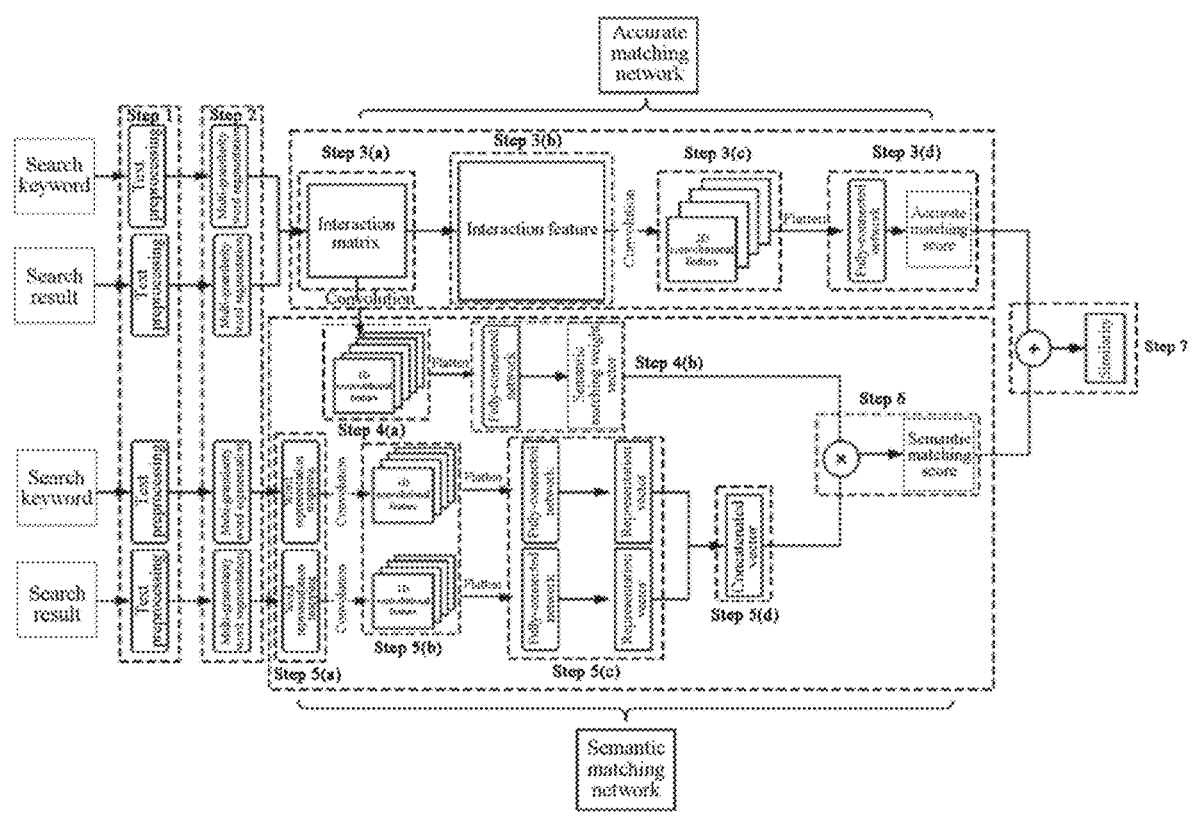
FIG. 3 is a schematic structural diagram of a similarity model according to an embodiment of this disclosure.

FIG. 3 is a schematic structural diagram of a similarity model according to an embodiment of this disclosure. That is, for the search keyword and one search result, description is made by using an example in which a similarity between the search keyword and the search result is calculated.

Inputs of the similarity model are the search keyword and the search result. For example, the search keyword is a character string with a length of $L_1$, and the search result is a character string with a length of $L_2$. For the scenario of the official account search in WeChat®, a search result is an official account title. Based on FIG. 3, the following steps are mainly described:

Step 1. respectively perform text preprocessing on the search keyword and the search result.

This step specifically includes: respectively performing special symbol processing, case conversion, simplified and traditional Chinese conversion, and the like on the texts of the search keyword and the search result. In this way, the texts of the search keyword and the search result are processed into a uniform format through preprocessing.

Step 2. Perform word segmentation on the preprocessed search keyword and the search result using multi-granularity word segmentation.

This step specifically includes: respectively performing word segmentation on the search keyword and the search result according to the preset high-frequency word set, obtaining a high-frequency word through division when the search keyword and the search result include the high-frequency word in the preset high-frequency word set, and dividing the remaining parts of a text by word, to respectively obtain word segmentation results corresponding to the search keyword and the search result.

Further, to resolve a problem of inconsistent text lengths of the search keyword and the search results. In this embodiment of this disclosure, a manner of a fixed length is used. Specifically, according to the preset fixed length, if the length of the text of the search keyword or each search result is greater than the preset fixed length, some texts whose lengths are greater than the preset fixed length are deleted, and if the length of the text is less than the preset fixed length, null characters are added at the end of the text, so that the length of the text is equal to the preset fixed length. The preset fixed length is, for example, 15, and the preset fixed lengths corresponding to the search keyword and the search result may also be different. This is not limited in this embodiment of this disclosure, and may be set according to an actual case.

For word segmentation manners, a conventional word segmentation method mainly includes two manners. In one manner, a word segmentation tool is trained according to an existing Chinese corpus, and word segmentation is then performed on the text based on the trained word segmentation tool. Because context semantics are more focused in this manner, the word segmentation result better conforms to a natural understanding manner of the text by a user, and is suitable for semantic feature extraction. However, this manner is not suitable for the accurate matching. A main reason is that the accurate matching focuses on only a degree to which two texts are identical. If the word segmentation result obtained in this manner is used as the input, no accurate matching may be generated.

For example, for two texts "红色" and "红脸色", actually, there is moderate accurate matching of the two texts. However, the Chinese word "红色" is not divided in this word segmentation manner, and "红脸色" is divided into two Chinese word segments "红" and "脸色", In this case, from the perspective of the accurate matching, there is no same part between the two texts, and this obviously conforms to the actual case.

In the other manner, fixed length word segmentation is used instead of the word segmentation tool. For example, when word segmentation is performed on "红色" according to a fixed length of 1, word segmentation results are "红"

and "㗊". This manner can meet the requirement of the accurate matching. However, because the context semantics of the text is not considered, it is likely that content that is semantically a word is divided. As a result, the overall semantics is affected, and semantic information extraction is not suitable.

Therefore, in this embodiment of this disclosure, in consideration of the features of Chinese texts, especially, a short text usually includes a plurality of words. If word segmentation granularity is excessively large, a specific search keyword needs to be inputted before the search result can be found. If the word segmentation granularity is excessively small, the accuracy of the search is affected. Therefore, multi-granularity word segmentation is used in this embodiment of this disclosure. For a high-frequency word, in consideration of the context semantics, the high-frequency word is considered as a whole for division. In addition, in consideration of the requirement of the accurate matching, for a non-high-frequency word, the non-high-frequency word is divided according to characters. That is, word segmentation is performed by using a fixed length of 1. In this way, the semantics and the accurate matching can be comprehensively considered, and different word segmentation strategies such as multi-granularity word segmentation are used for different parts of the text, so as to meet the requirements of parts of the text, and more effectively mine the information in the text from a plurality of levels. This is more suitable for short text matching in a multi-search need scenario.

Step 3. Calculate an accurate matching score $s_1$ of the search keyword and the search result.

For example, if each of the search keyword and the search result can be divided into 15 word segments, for example, the search keyword is correspondingly divided into $q_1, \ldots, q_{15}$, and the search result is correspondingly divided into $d_1, \ldots, d_{15}$. Specifically:

First, at Step 3(a), an interaction matrix, for example, $M \in R^{15 \times 15}$ ($M_{ij}=[q_i==d_j]$), of the search keyword and the search result is calculated through the accurate matching. In this embodiment of this disclosure, because it is assumed that there are 15 word segments in the word segmentation result of each of the search keyword and the search result, a 15*15 matrix may be obtained after the accurate matching is performed on each word.

Next, at Step 3 (b), an interaction feature is calculated. For example, the interaction matrix is $$MF = \frac{M \otimes M}{\text{softplus}(|D \otimes I - I \otimes D| + 1)} \in R^{225 \times 225},$$

where $D \in R^{15 \times 15}$ ($D_{ij}=|i-j|$), $I \in R^{15 \times 15}$ ($I_{ij}=[i==j]$), and $\otimes$ represents a Kronecker product operation.

In this embodiment of this disclosure, a relative positional relationship between the word segments in the word segmentation results of the text is mined according to the interaction matrix, and the text word order is considered, thereby improving the accuracy of the accurate matching. This is because, in the conventional technology, accurate matching information in the text is directly mined according to an interaction matrix, and the impact of relative position is ignored. In this case, the accurate matching tends to be inaccurate. For example, based on only the interaction matrix, a degree of accurate matching between texts "篮—球" and "篮乐篮 llz0978-" is the same as that of the texts "篮—球" and "篮—球". That is, three characters are hit in both cases. However, it is obvious that "篮乐篮llz0978—" is less similar to "篮—球" than "篮—球". Therefore, in this embodiment of this disclosure, the relative positional relationship between the word segments, that is, the relative positional relationship between "篮" and "—" in the two texts, is considered, and information that the relative position in "篮—球" and "篮乐篮 llz0978-" is relatively far and the relative position in "篮—球" and "篮—球" is relatively close. That is, the degree of accurate matching of "篮—球" and "篮—球" is relatively high, so that the degree of accurate matching between the texts can be determined more accurately.

Next, at Step 3 (c), a convolutional feature of the interaction feature MF is calculated, and the convolutional feature is flattened into a vector.

Specifically, the interaction feature is inputted into a pre-trained first convolutional network, to obtain a convolutional feature that corresponds to the interaction feature and is outputted after the first convolutional network performs feature extraction on the interaction feature, and the convolutional feature is flattened into the vector, to obtain a vector representation of the convolutional feature that corresponds to the interaction feature.

Figure 4:
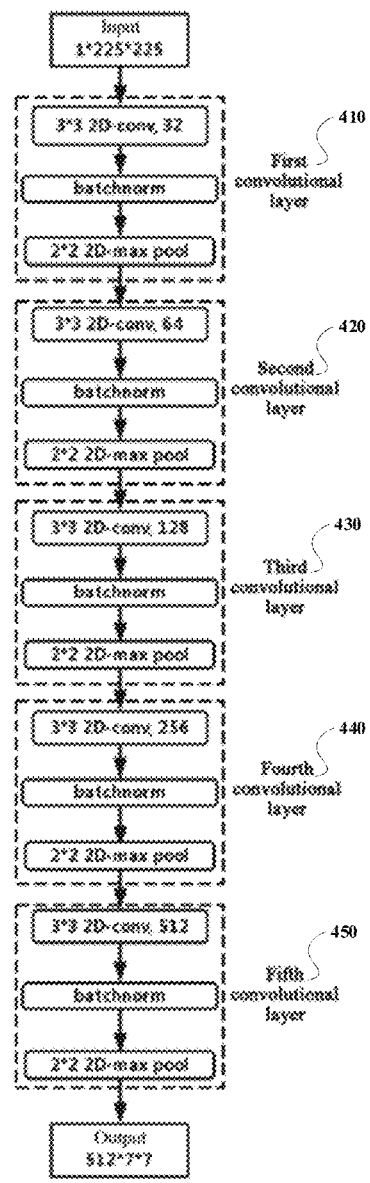
FIG. 4 is a schematic structural diagram of a first convolutional network for accurate matching according to an embodiment of this disclosure.

For example, FIG. 4 is a schematic structural diagram of a first convolutional network for accurate matching according to an embodiment of this disclosure. It can be learned from FIG. 4 that, the first convolutional network includes five convolutional layers, which are inputted into an interaction feature with a size of 1*255*255, and after the five convolutional layers, a matrix with a size of 512*7*7, that is, a convolution matrix of 7*7 in 512 channel dimensions, is outputted. That is, the first convolutional network performs feature extraction, to extract a 512-dimensional convolutional feature. A channel quantity 512 may be alternatively set according to an actual case. This is not limited in this embodiment of this disclosure.

A brief description is made for each convolutional layer. In the first convolutional layer 410, a 2-dimensional convolution matrix (2D-conv) with 32 convolution kernels of a size of 3*3 is first applied, batchnorm processing is then performed, and finally 2D-max pooling with a window size of 2*2 is performed. For the second convolutional layer 420 to the fifth convolutional layer 450, a quantity of convolution kernels is increased in the layers by 64, 128, 256, and 512 sequentially, and the remaining parts operations are the same as those in the first convolutional layer 410. In this way, after five convolutional layers are applied, a 7*7 matrix in 512 dimensions is finally obtained.

Finally, (d), the accurate matching score $s_1$ is obtained according to the convolutional feature corresponding to the interaction feature. Specifically, the vector representation of the convolutional feature corresponding to the interaction feature is inputted into the pre-trained first fully-connected network. The convolutional feature is mapped into a first preset vector space based on the first fully-connected network, to obtain a one-dimensional vector outputted by the first fully-connected network, and the outputted one-dimensional vector is used as the accurate matching score of the corresponding search result. A manner of acquiring the vector representation of the convolutional feature corresponding to the interaction feature is: flattening the convolutional feature corresponding to the interaction feature into a vector, that is, obtaining the vector representation of the convolutional feature. For example, a matrix with a size of 512*7*7 may be flattened into a vector with a size of (512*7*7=25088).

Figure 5:
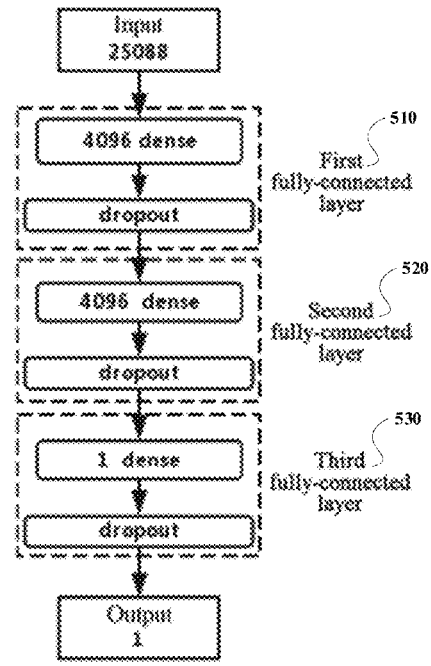
FIG. 5 is a schematic structural diagram of a first fully-connected network for accurate matching according to an embodiment of this disclosure.

For example, FIG. 5 is a schematic structural diagram of a first fully-connected network for accurate matching according to an embodiment of this disclosure. As shown in FIG. 5, the first fully-connected network includes three fully-connected layers, an input is a vector with a size of 25088, and is calculated through the three fully-connected layers, and a one-dimensional vector with a size of 1 is finally outputted. Specifically, for the first fully-connected layer 510, a fully-connected layer (dense) with a dimension size of 4096 is first applied, and a dropout operation is then performed. For the second fully-connected layer 520, a dense with a dimension size of 4096 is first applied, and the dropout operation is then performed. For the third fully-connected layer 530, a fully-connected layer with a dimension size of 1 is first applied, the dropout operation is performed, and a vector with a size of 1 is finally mapped.

In this way, the convolutional feature outputted by the first convolutional network is mapped into an eigenvector with a fixed length by using the first fully-connected network.

Step 4. Calculate a semantic matching weight vector.

The semantic matching weight vector represents the impact of the relative position information of word segments in the accurate matching on the semantic matching. Specifically:

At step 4(a), the interaction matrix is inputted into a pre-trained second convolutional network according to the interaction matrix for accurate matching of the search keyword and the search result, to obtain a convolutional feature that corresponds to the interaction matrix and is outputted after the second convolutional network performs feature extraction on the interaction matrix.

For example, a quantity of convolution kernels of the second convolutional network is 16, and a kernel size is 15. A one-time one-dimensional convolution operation is performed on the interaction matrix M through the one-dimensional second convolutional network according to the interaction matrix M obtained in step 3, and the interaction matrix is flattened into a vector, to obtain a vector representation of the interaction matrix. For example, a size of the interaction matrix M is 15*15, and a 15*16 matrix is outputted through the second convolutional network, and may be flattened into a vector with a size of 240.

At step 4(b), the vector representation of the convolutional feature corresponding to the interaction matrix is inputted into a pre-trained second fully-connected network. The convolutional feature is mapped into a second preset vector space based on the second fully-connected network, to obtain a preset-dimensional vector outputted by the second fully-connected network, and the outputted preset-dimensional vector is used as the semantic matching weight vector of the corresponding search result.

For example, the second fully-connected network includes a fully-connected layer, an input dimension is a 240 vector, and a vector with a dimension of 64 is then outputted through spatial transformation mapping of the second fully-connected network, to obtain the semantic matching vector $w \in R^{64}$.

In this way, in this embodiment of this disclosure, the semantic matching weight vector is extracted from the interaction matrix, so that it can be met that when the search query is more of a navigational need, the semantic matching weight vector is relatively low, thereby reducing the impact of the semantic matching on the final similarity result. When the search query is more of a general need, the semantic matching weight vector is relatively high, thereby reducing the impact of the accurate matching on the final similarity result. Therefore, the impact of parts of the model on the final similarity result can be adaptively adjusted according to different search needs, to improve the accuracy of the similarity calculation, so that the final search results that rank in the top better meet needs of a user.

Step 5. Calculate vector representations for semantic matching of the search keyword and the search result.

For example, if the divided word segmentation result corresponding to the search keyword is $q'_1, \ldots, q'_{15}$, and the divided word segmentation result corresponding to the search result is $d'_1, d'_{15}$.

Specifically:

At step 5(a), a word vector of each word in the word segmentation results corresponding to the search keyword and the search result is respectively obtained according to the preset word vector model, and word representation matrices of the search keyword and the search result are respectively obtained according to the word vector of the each word in the corresponding word segmentation results. For example, the preset word vector model is Word2vec, or certainly may be another word vector model. This is not limited in this embodiment of this disclosure. For example, when a mapped word vector dimension is set to 300, the each word in the word segmentation results corresponding to the search keyword and the search result may be mapped into a word vector with a size of 300. If there are 15 word segments in the word segmentation result, a word representation matrix corresponding to the final search keyword is $Q \in R^{15 \times 30}$, and a word representation matrix corresponding to the search result is $T \in R^{15 \times 300}$.

At step 5(b), the word representation matrices are respectively inputted into a pre-trained third convolutional network, to obtain convolutional features that correspond to the word representation matrices and are outputted after the third convolutional network performs feature extraction on the word representation matrices.

For example, if the third convolutional network includes 32 convolution kernels, and 3 kernels, the one-dimensional convolution operation is respectively performed on the word representation matrices, that is, Q and T, of the search keyword and the search result through the third convolutional network, and the word representation matrices are flattened into vectors, to respectively obtain the vector with a size of 32.

At step 5(c), the vector representations of the convolutional features corresponding to the word representation matrices are inputted into a pre-trained third fully-connected network. The convolutional features are mapped into a third preset vector space based on the third fully-connected network, to obtain preset-dimensional vectors outputted by the third fully-connected network, and the outputted preset-dimensional vectors are respectively used as corresponding semantic representation vectors of the search keyword or the search result.

Figure 6:
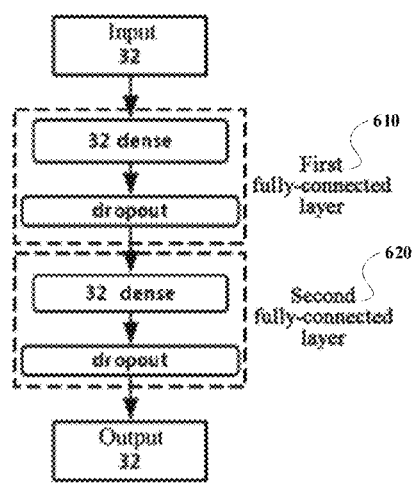
FIG. 6 is a schematic structural diagram of a third fully-connected network for semantic matching according to an embodiment of this disclosure.

For example, FIG. 6 is a schematic structural diagram of a third fully-connected network for semantic matching according to an embodiment of this disclosure. As shown in FIG. 6, the third fully-connected network includes two fully-connected layers, an input is a vector with a size of 32, and is calculated through two fully-connected layers, and a vector with a size of 32 is finally outputted. Specifically, for the first fully-connected layer 610, a dense with a dimension size of 32 is first applied, and a dropout operation is then performed. For the second fully-connected layer 620, a dense with a dimension size of 32 is first applied, and the dropout operation is then performed, to finally output the vector with the size of 32 that meets a required representation form. For example, the semantic representation vectors of the search keyword and the search result respectively obtained through the third fully-connected network are $f_q, f_t \in R^{32}$ respectively.

At step 5(*d*), the semantic representation vectors of the search keyword and the search result are respectively concatenated, to obtain a concatenated semantic representation vector.

For example, two semantic representation vectors $f_q, f_t$ of the search keyword and the search result are concatenated, to obtain a final concatenated semantic representation vector $f \in R^{64}$.

Step 6. Calculate a semantic matching score of the search keyword and the search result.

Specifically, a dot product operation is performed on the concatenated semantic representation vector and the corresponding semantic matching weight vector, to obtain the semantic matching score of the search result. For example, the semantic matching score of the search keyword and the search result is $s_2 = w \otimes f$, and $\otimes$ represents a Kronecker product operation.

Step 7. Calculate a similarity between the search keyword and the search result.

For example, a final score of the similarity between the search keyword and the search result is: $s = s_1 + s_2$, $s_1$ is the accurate matching score, and $s_2$ is the semantic matching score.

In this embodiment of this disclosure, a new similarity model algorithm is provided. During accurate matching, an interaction matrix for accurate matching is calculated. In addition, in consideration of the impact of a text word order and the context, a relative positional relationship between word segments in word segmentation results is determined, an interaction feature is determined, and an accurate matching score is determined according to the interaction matrix, to deeply mine the structural information of a text, so that results of the accurate matching better meet needs of a user. Moreover, the interaction matrix for accurate matching is introduced into a semantic matching part, to determine a semantic matching weight vector, and a semantic matching score is determined according to the semantic matching weight vector and a semantic representation vector. Semantic matching weight vectors may be adjusted according to different search needs of the user, thereby improving the accuracy and reliability of similarity calculation, so that final similarities better meet the search needs of the user, and the accuracy of sorting is improved.

Based on the foregoing embodiments, it can be learned that, in this embodiment of this disclosure, the search result processing method is performed by using a similarity model, and a search keyword and search results are processed by using the similarity model, to obtain similarities between the search results and the search keyword. Therefore, the accuracy of the similarity model is very significant. The similarity model needs to be trained first before application, and an adequate model usually requires adequate training samples.

Therefore, the embodiments of this disclosure further provide a method for obtaining more reliable training samples. Processing is performed on original data, to obtain more reliable training samples, and a manner of multi-target training and optimization of a similarity model is provided based on different training samples. A similarity model is trained and optimized in a plurality of scenarios, which can improve the accuracy of the similarity model, and meet similarity calculation for different search needs of the user. The following describes the training process of the similarity model in this embodiment of this disclosure in detail:

The training process is usually performed at a backend server. The training of modules of the model may be complex and require a large computing amount. Therefore, the training process is implemented by the backend server, so as to apply the trained modules and results to each smart terminal, to implement the similarity calculation and sorting of the search results.

Figure 7:
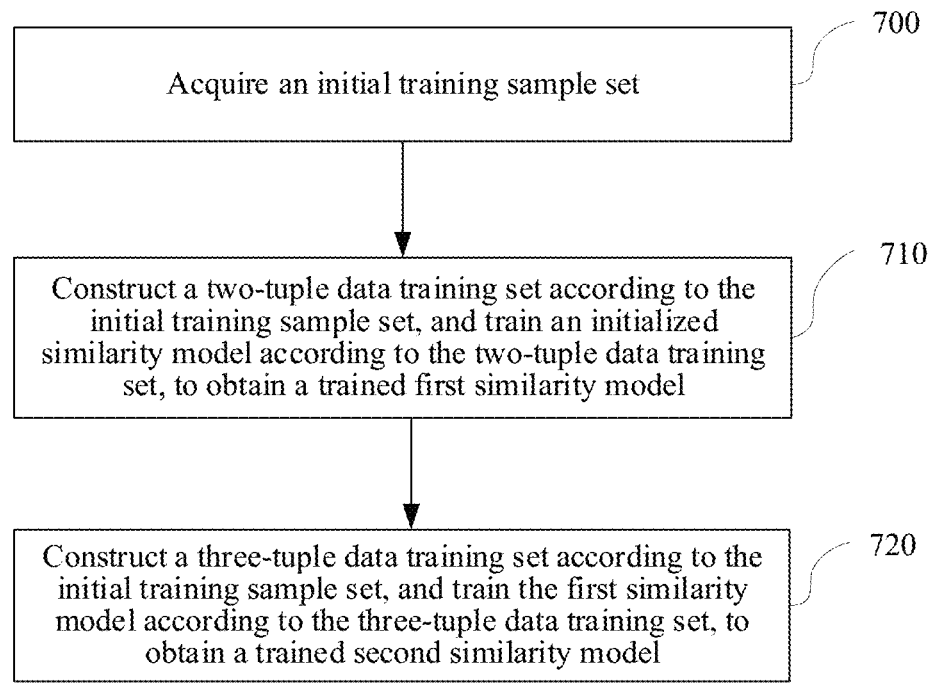
FIG. 7 is a flowchart of a similarity model training method according to an embodiment of this disclosure.

Specifically, FIG. 7 is a schematic flowchart of a similarity model training method according to an embodiment of this disclosure. The method includes the following steps:

Step 700. Acquire an initial training sample set.

The performing step 700 specifically includes:

first, acquiring an original search click record set according to a search click behavior of a user, each original search click record in the original search click record set including at least a search keyword, an exposure list, and a click result, the click result being a clicked search result.

In this embodiment of this disclosure, original record data may be acquired from an original search click behavior log of the user. Generally, each record includes a search keyword, an exposure list, and a click result of the user. The exposure list includes a plurality of search results. For example, the user inputs a search keyword "A", an exposure list, that is, a plurality of search results may be obtained. The user may click a search result according to needs, and the clicked search result is used as the click result.

In practice, the acquired original search click record set usually has relatively large noise, a search result clicked by the user is diverse, and the clicked search result is not necessarily the search result required by the user. If the original record data is directly used for similarity model training, the noise is relatively large and affects the reliability of the final trained model. Therefore, a particular rule is set in this embodiment of this disclosure, for filtering and screening the original record data, so that the obtained data has better practical value.

The original search click record set is then filtered based on the preset rule, the original search click records that meet the preset rule are filtered out, and an initial training sample set is obtained according to the filtered original search click record set.

A data form of initial training samples in the obtained initial training sample set is consistent with a data form of the original search click records. That is, each training sample in the initial training sample set also includes at least a search keyword, an exposure list, and a click result.

Figure 8:
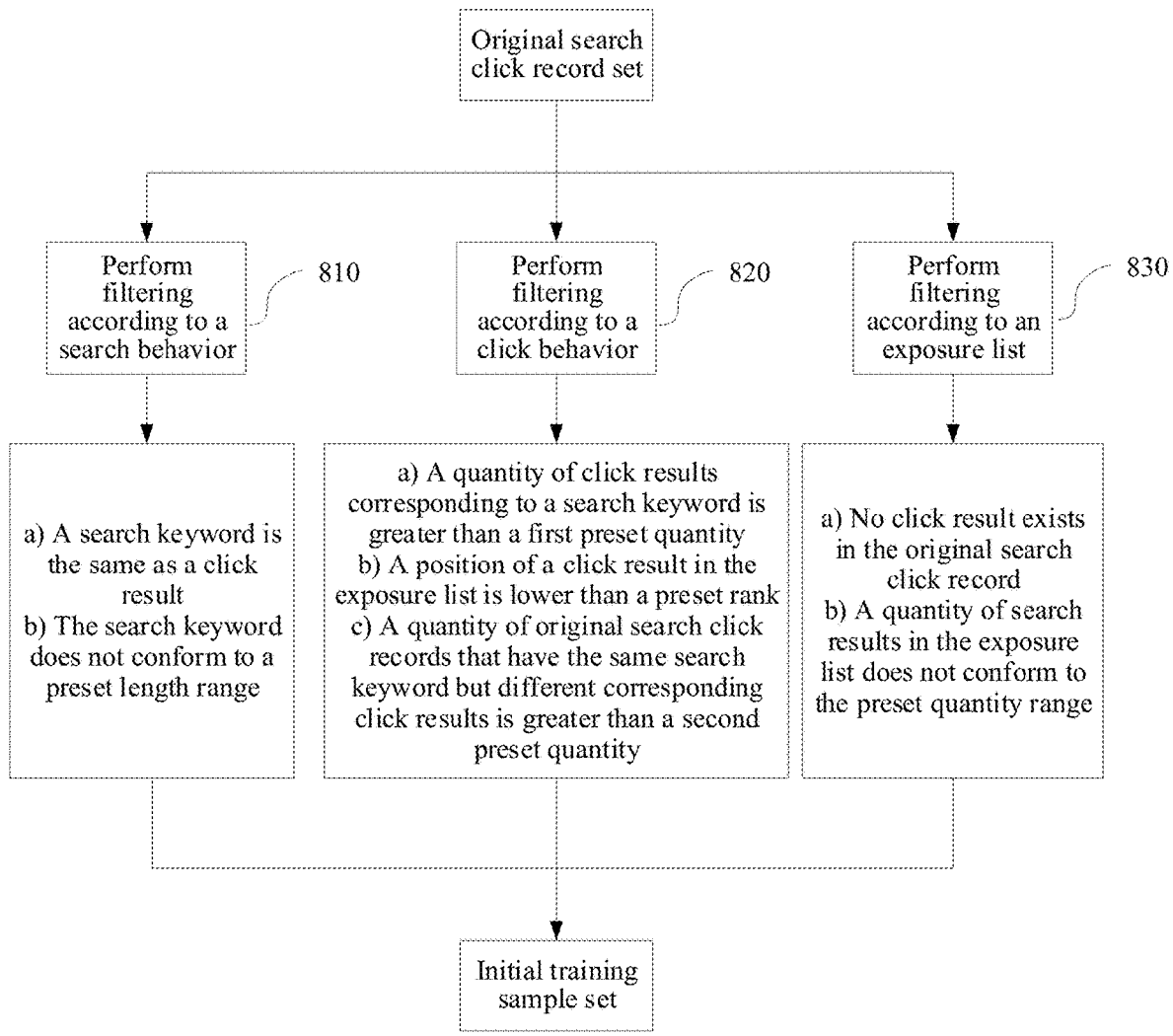
FIG. 8 is a flowchart of a method for acquiring an initial sample set according to an embodiment of this disclosure.

Specifically, FIG. 8 is a flowchart of a method for acquiring an initial sample set according to an embodiment of this disclosure. The method includes the following steps: It can be learned that, for the original search click record set, to filter the original search click record set, set preset rules mainly include three aspects:

1) In the first aspect, filtering is performed according to a search behavior at step 810.

The preset rule is that the search keyword is the same as the click result, and/or the search keyword does not conform to a preset length range. For example, if the search keyword is identical with the click result, it indicates that an identical search result is found. This record does not have high value for the similarity model training, and a corresponding original search click record is filtered out. In another example, for a search keyword that does not conform to the preset length range, for example, an excessively long or excessively short search keyword, for the similarity model training, data processing is more difficult, and the accuracy is also affected. Therefore, the search keyword is filtered out.

2) In the second aspect, filtering is performed according to a click behavior at step 820.

The preset rule is that a quantity of click results corresponding to the search keyword is greater than a first preset quantity, or the position of the click result in the exposure list is lower than a preset rank, or a quantity of original search click records that have the same search keyword but different corresponding click results is greater than a second preset quantity.

For example, the user searches a search keyword, and clicks a plurality of search results that are in the returned exposure list and correspond to a plurality of click results. That is, a one-time search of the user corresponds to a plurality of clicks. In this case, it indicates that the reference value of the click results of the user is relatively low, and an association between the click results and the search keyword may not be high. Therefore, the reliability of this record is relatively low, which adversely affects the training of the similarity model.

In another example, the position of the click result in the exposure list is relatively low. For example, the click result ranks $100^{th}$. In this case, it is possible that the click result clicked by the user is not associated with the search keyword. The user may only make a random search or click a search result at random, and the click result is therefore filtered out.

In another example, a quantity of original search click records with the same search keywords but different corresponding click results is greater than a preset quantity. That is, the search keywords of a plurality of records are the same, but the corresponding click results are different. It may be considered that different users search the same search keyword, and there are excessive corresponding click results. In this case, it indicates that an association between the click result and the search keyword in the plurality of records may be relatively low, or it indicates that the search keyword may not have very highly associated search results. These records may affect the accuracy of training the similarity model. Therefore, data of these records is filtered out in this embodiment of this disclosure.

3) In the third aspect, filtering is performed according to the exposure list at step 830.

The preset rule is that no click result exists in the original search click record, or a quantity of search results in the exposure list does not conform to the preset quantity range. For example, after a user searches a search keyword and there is no click behavior, there is no click result in the original search click records. In this case, this record cannot be used for training a similarity model, and needs to be filtered out. In another example, an exposure list in the original search click records is excessively long or excessively short, that is, an excessively large or excessively small quantity of search results are obtained. This also adversely affects the model training, and filtering is performed. In this way, the original search click data is filtered to remove some data that adversely affects the training of the similarity model, and a relatively reliable initial training sample set may be obtained from a large quantity of original search click records.

Step 710. Construct a two-tuple data training set according to the initial training sample set, and train an initialized similarity model according to the two-tuple data training set, to obtain a trained first similarity model.

Each piece of two-tuple data in the two-tuple data training set includes at least a search keyword, a search result, and a label representing whether the search keyword is similar to the search result.

In this embodiment of this disclosure, the corresponding training sample set is constructed based on the initial training sample set according to different training targets, thereby improving the accuracy of the similarity model. The two-tuple data is pairwise data, and one piece of the pairwise data includes two texts and a label. For example, the label is 0 or 1, and 0 or 1 is used for representing whether the two texts are similar. If pairwise data is (A, B, 1), it indicates that a text A and a text B are similar.

The targets of the similarity model are trained based on the two-tuple data, and the principle is that a user assumes that there are two classes of search results. For one class of search results, a search keyword of the user is met from the perspective of text matching, and a label indicating that a click result is similar to the search keyword is set to 1. For the other class of search results, a search keyword of the user is not met, a label indicating that a click result is not similar to the search keyword is set to 0. Based on the target principle, the data of the initial training sample set may be divided into two classes. Specifically, a binary classification model may be used for classification, and the binary classification model may be optimized in a conventional training manner of a supervised classification problem, so that the initial training sample set may be divided into two classes based on the optimized binary classification model, so as to construct a two-tuple data training set.

The data form of the each initial training sample in the initial training sample set may be "a search keyword, a click result, an unclicked search result". There may be a plurality of unclicked search results, that is, search results other than the click result in the exposure list. Certainly, the data form of the initial training sample is not limited, provided that the search keyword, the click result, and the unclicked search results in the exposure list can be obtained from the initial training sample in this embodiment of this disclosure.

Specifically, the performing step 710 specifically includes:

First, a two-tuple data training set is constructed according to the initial training sample set. The constructing specifically includes:

1) Unclicked search results are determined according to the exposure list.

2) The following processing is performed for each initial training sample in the initial training sample set:

determining, when a text matching similarity between the click result and the search keyword is greater than a first preset threshold, a search result whose text matching similarity with the search keyword is not less than a second preset threshold in the unclicked search results, and filtering out the determined search result from the unclicked search results; forming the search keyword and the click result into a positive sample pair when the filtered unclicked search results are not empty, the label being 1; and randomly selecting a search result from the filtered unclicked search results, and forming the search keyword and the randomly selected search result into a negative sample pair, the label being 0.

The first preset threshold and the second preset threshold may be set according to an actual case. This is not limited in this embodiment of this disclosure. That is, the label of 1 may be used for representing similarity, and the label of 0 may be used for representing non-similarity.

3) The two-tuple data training set is constructed according to positive sample pairs and negative sample pairs that correspond to the initial training sample set.

In this way, one positive sample pair and one negative sample pair may be generated according to the each initial training sample in the initial training sample set, to obtain the two-tuple data training set.

An initialized similarity model is then trained according to the two-tuple data training set, to obtain the trained first similarity model. An input of the initialized similarity model is the two-tuple data training set, an output is a similarity result, and a target function of training the initialized similarity model is to minimize a loss function between the outputted similarity results and the label of the two-tuple data training set. For example, an Adam optimization algorithm and a binary cross entropy loss may be used to optimize target, to continuously optimize and train the similarity model until convergence. That is, the loss function continuously decreases and tends to be stable.

In this way, in this embodiment of this disclosure, the two-tuple data training set is data representing whether the search keyword is similar to the search result. The data is divided into two classes of similarity and non-similarity. The similarity model is trained based on the two-tuple data training set, that is, the similarity model is trained based on a class optimization target, and the accuracy of determining the similarity between the search result and the search keyword by the similarity model may be continuously optimized.

Step 720. Construct a three-tuple data training set according to the initial training sample set, and train the first similarity model according to the three-tuple data training set, to obtain a trained second similarity model.

Each piece of three-tuple data in the three-tuple data training set includes at least a search keyword, a first search result, and a second search result, and a similarity between the search keyword and the first search result is greater than a similarity between the search keyword and the second search result.

In this embodiment of this disclosure, the training process of step 720 is based on the training result in the foregoing step 710. In step 710, the data is divided into two classes of similarity and non-similarity, to train the similarity model. However, in practice, there are a large quantity of cases that cannot be simply divided by a classification criterion.

Therefore, in this embodiment of this disclosure, a sorted optimization target may further be used to retrain the first similarity model, to construct the three-tuple data training set. The first similarity model is retrained based on the three-tuple data training set, and a principle of the target is to optimize the sorted results by using differences in similarities of different texts to the same text. For example, the three-tuple data is (the search keyword, doc1, doc2), and it is known that a matching degree of (the search keyword, doc1) is greater than a matching degree of (the search keyword, doc2). Through such three-tuple data training, the similarity model may finally enable that a similarity score calculated for (the search keyword, doc1) is greater than that of (the search keyword, doc2). That is, doc1 in the search results corresponding to the search keyword may rank higher than doc2.

Specifically, the performing step 720 specifically includes:

First, a three-tuple data training set is constructed according to the initial training sample set. The constructing specifically includes: performing the following processing for each initial training sample in the initial training sample set:

1) Confidences of search results in an exposure list corresponding to the initial training sample are determined The determining specifically includes:

a. A position of a click result of the initial training sample in the corresponding exposure list is respectively counted.

That is, one initial training sample includes a search keyword, an exposure list, and a clicked click result in the exposure list. The position of the click result in the exposure list represents a rank of the click result in the exposure list. For example, a position of a click result corresponding to an $i^{th}$ initial training sample in the exposure list is $p_i$.

b. The frequency of clicking at each position in the exposure list is respectively determined according to the counted positions of the click results in the exposure list. For example, the frequency of clicking at an $i^{th}$ position in the exposure list may be:

$$f_i = \frac{\sum_{j=1}^{n}[p_j == i]}{n} (i = 1, 2, \ldots).$$

c. The frequency of clicking the each search result at the position in the corresponding exposure list is determined according to the positions of the click results in the corresponding exposure list. For example, for a search result i, if there are m initial training samples whose click results are the search results i, and the positions of the initial training samples are $q_j$ (j=1, . . . , m), the frequency of clicking the search result at the position in the corresponding exposure list is $$g_{ij} = \frac{\sum_{k=1}^{m}[q_k == j]}{m} (j = 1, 2, \ldots).$$

d. Confidences of clicking the each search result at the positions in the corresponding exposure list are respectively determined according to the frequency of clicking the each search result at the positions and the frequency of clicking at each position in the corresponding exposure list. For example, a confidence of clicking a search result i at a position j in the corresponding exposure list is:

$$h_{ij} = \frac{g_{ij}}{f_j}.$$

2) When a confidence of one click result is higher than confidences of all other search results in the exposure list, the confidence of the click result is not less than a preset score value, and it is determined that a confidence of a search result with the lowest confidence in the unclicked search results is less than the preset score value, the search keyword, the click result, and the determined unclicked search result with the lowest confidence are formed into one piece of three-tuple data.

That is, the click result with the highest confidence is a first search result in the three-tuple data, and the unclicked search result with the lowest confidence is a second search result in the three-tuple data.

3) The three-tuple data training set is constructed according to three-tuple data corresponding to initial training samples.

The first similarity model is then trained according to the three-tuple data training set, to obtain a trained second similarity model. An input of the first similarity model is the three-tuple data training set, and an output is two similarity results. The target function of training the first similarity model is to minimize a loss function between a size relationship of the outputted two similarity results and a size relationship of two similarities of the three-tuple data training set.

For example, an Adam optimization algorithm and a triplet hinge loss may be used to optimize target, to continuously optimize and train the similarity model until convergence. That is, the loss function continuously decreases and tends to be stable. A three-tuple hinge loss is a loss function in deep learning, for training samples with relatively small differences, including an anchor example, a positive example, and a negative example. The similarity calculation of the samples is implemented by optimizing a target in which a distance between the anchor example and the positive example is less than a distance between the anchor example and the negative example. For example, if the distance between the anchor example and the positive sample is $d^+$, and the distance between the anchor example and the negative example is $d^-$, the trained target loss function is: triplet hinge loss=$\max(0, d^+ - d^- + \alpha)$, where a is a preset non-negative parameter.

In this way, in this embodiment of this disclosure, the three-tuple data training set is data representing the similarity between two search results and the search keyword. The first similarity model is retrained based on the three-tuple data training set. That is, the similarity model is trained based on the sorted optimization target, so that the similarity result obtained by the similarity model can be more accurate for sorting.

Currently, actual data noise is not considered in the conventional technology, and mostly, manual labeling data or only a click result of a search of a user is considered as labeling data for the model training. It is more difficult to acquire the training data in this manner in an actual application scenario, there is relatively large noise, and as a result the model training is affected. In the conventional technology, generally, a single-target training is used, and two manners are provided. In one manner, conventional supervised learning is used, and a classification model is trained according to labeled data. However, this manner cannot resolve a large amount of problems of data indivisibility. That is, data cannot be simply labeled as 0 or 1. If this part of data is reserved, a large amount of noise tends to be introduced, and the effect of model training is affected. However, if this part of data is removed, a large amount of valuable information is lost. In the other manner, an unsupervised sorting optimization model is used. Although this manner can better resolve the problem that only a slight difference exists between the data and the data cannot be easily classified, if this manner is used in the large amount of divisible data, a higher order of the training data than the former manner is required to enable the model to achieve the same effect.

In this embodiment of this disclosure, in consideration of the presence of both a large amount of divisible data and fine-grained difference data in the search click record data, the reliability of the model trained only by using the existing single-target training manner is low. Therefore, in this embodiment of this disclosure, an original search click record set is filtered, to obtain an initial training sample set. Based on the initial training sample set, a multi-target optimization manner is provided. Based on different optimization targets, different training sets are constructed. Compared with a conventional training manner that is based on labeled data or only uses a click behavior as labeled data, in this embodiment of this disclosure, in consideration of a click behaviors and a click distribution, a two-tuple data training set and a three-tuple data training set are constructed. This is more specific and has better practical value for similarity model training, so that relatively reliable training data can be effectively obtained from a large amount of data with noise and the costs of manual labeling can be reduced.

Therefore, similarity models may be trained respectively according to constructed training sets, two targets may be optimized simultaneously, and each target may be improved and optimized in combination with a current search scenario, so that a finally trained similarity model can consider both a general need and a navigational need of searches of the user, and it is met that similarity results better meet actual needs of the user in different search scenarios.

Figure 9:
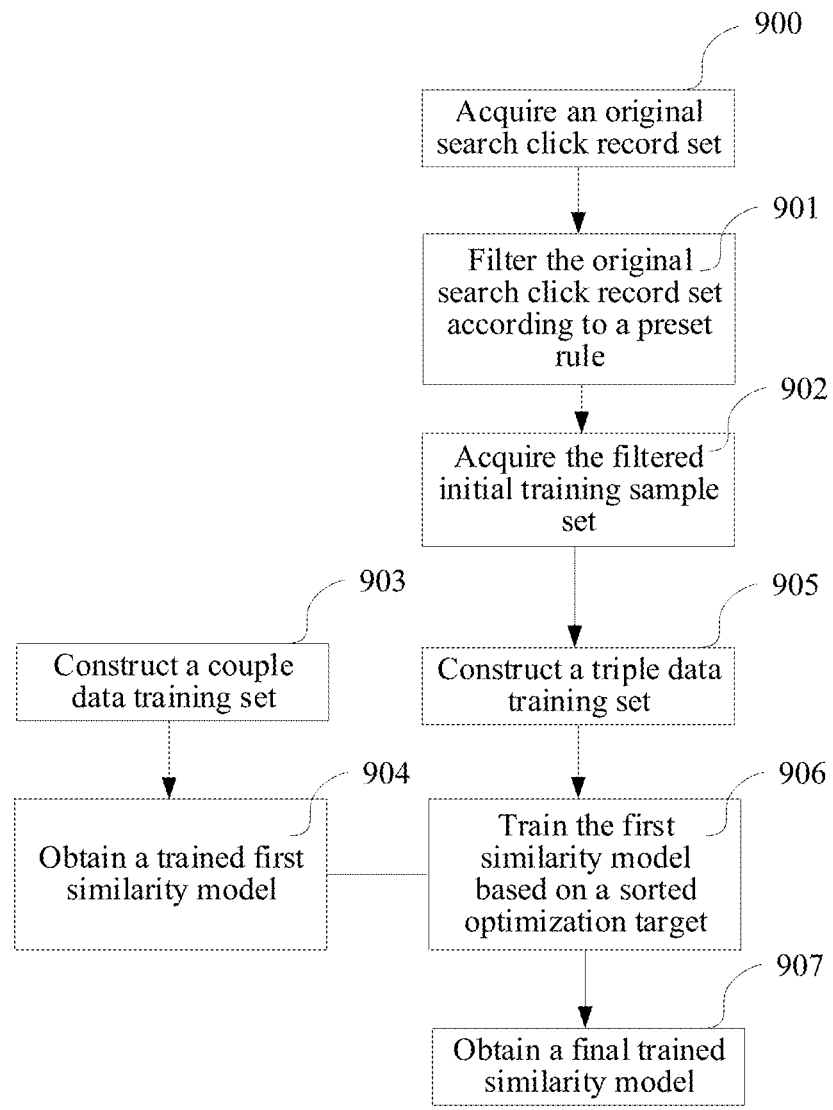
FIG. 9 is a flowchart of another similarity model training method according to an embodiment of this disclosure.

The following describes a training process of a similarity model in detail by using a specific application scenario. FIG. 9 is a flowchart of another similarity model training method according to an embodiment of this disclosure.

Step 900. Acquire an original search click record set.

Step 901. Filter the original search click record set according to a preset rule.

Step 902. Acquire the filtered initial training sample set.

Step 903. Construct a two-tuple data training set.

Each piece of two-tuple data in the two-tuple data training set includes at least a search keyword, a search result, and a label representing whether the search keyword is similar to the search result.

Step 904. Obtain a trained first similarity model based on a class optimization target.

Specifically, an initialized similarity model is trained according to the two-tuple data training set, to obtain the first similarity model.

Step 905. Construct a three-tuple data training set.

Each piece of three-tuple data in the three-tuple data training set includes at least a search keyword, a first search result, and a second search result, and a similarity between the search keyword and the first search result is greater than a similarity between the search keyword and the second search result.

Step 906. Train the first similarity model based on a sorted optimization target.

Specifically, the first similarity model is trained according to the three-tuple data training set, to obtain a trained second similarity model.

Step 907. Obtain a final trained similarity model.

That is, the second similarity model obtained through training is the final trained similarity model.

In this embodiment of this disclosure, for the multi-target training manner of the similarity model, a multi-stage training manner may be used to respectively optimize each target, or both a simultaneous training manner or an alternate training manner may be used to respectively optimize each target. This is not limited.

In this embodiment of this disclosure, the training process of the similarity model may be alternatively divided into three major parts. The foregoing step 900 to step 902 are the first step: acquiring an initial training sample set. Step 903 and step 904 are the second step: training a similarity model based on a first optimization target training, that is, based on the class optimization target. Step 905 and step 906 are the third step: retraining the similarity model after the first optimization target training is performed based on second optimization target training, that is, based on a sorted optimization target, to finally obtain a similarity model after secondary training of two optimization targets is performed.

Figure 10:
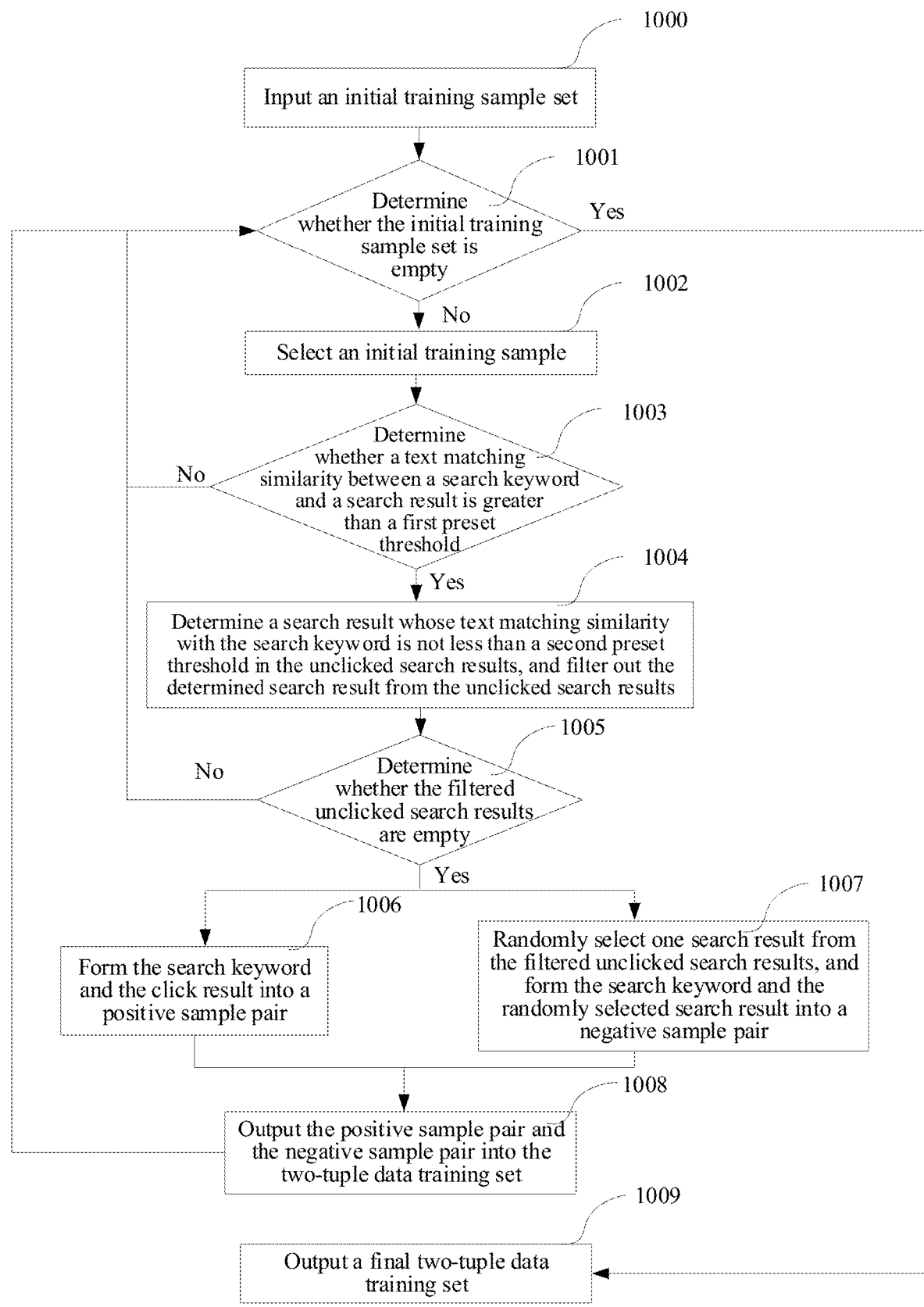
FIG. 10 is a flowchart of a method for constructing a two-tuple data training set according to an embodiment of this disclosure.

Based on the foregoing embodiments, it can be learned that, in the training process of the similarity model, a main process is to construct the training set. The constructing a two-tuple data training set and a three-tuple data training set in step 903 and step 905 is respectively described in detail below:

FIG. 10 is a flowchart of a method for constructing a two-tuple data training set according to an embodiment of this disclosure. The method includes the following steps:

Step 1000. Input an initial training sample set.

Step 1001: Determine whether the initial training sample set is empty. If the initial training sample set is empty, step 1009 is performed, or otherwise, step 1002 is performed.

Step 1002. Select an initial training sample.

That is, one initial training sample is selected from the initial training sample set each time for subsequent processing, and the initial training sample set is updated until all initial training samples are selected.

Step 1003. Determine whether a text matching similarity between the search keyword and the search result is greater than a first preset threshold. If the text matching similarity between the search keyword and the search result is greater than the first preset threshold, step 1004 is performed, or otherwise, step 1001 is performed.

The text matching similarity herein is a text literal similarity. The first preset threshold, for example, 0.01, may be set according to an actual case.

Step 1004. Determine a search result whose text matching similarity with the search keyword is not less than a second preset threshold in the unclicked search results, and filter out the determined search result from the unclicked search results.

The second preset threshold, for example, 0.8, may be set according to an actual case.

Step 1005. Determine whether the filtered unclicked search results are empty. If the filtered unclicked search results are empty, step 1006 and step 1007 are respectively performed, or otherwise, step 1001 is performed.

Step 1006. Form the search keyword and the click result into a positive sample pair.

In this case, a label is 1.

Step 1007. Randomly select one search result from the filtered unclicked search results, and form the search keyword and the randomly selected search result into a negative sample pair.

In this case, a label is 0.

Step 1008. Output the positive sample pair and the negative sample pair into the two-tuple data training set.

Step 1009. Output a final two-tuple data training set.

That is, for an initial training sample each time, if the positive sample pair and the negative sample pair can be constructed, the positive sample pair and the negative sample pair are combined and outputted into the two-tuple data training set, and the each initial training sample in the initial training sample set is sequentially processed unit all the initial training samples are processed, to obtain the final two-tuple data training set.

Figure 11:
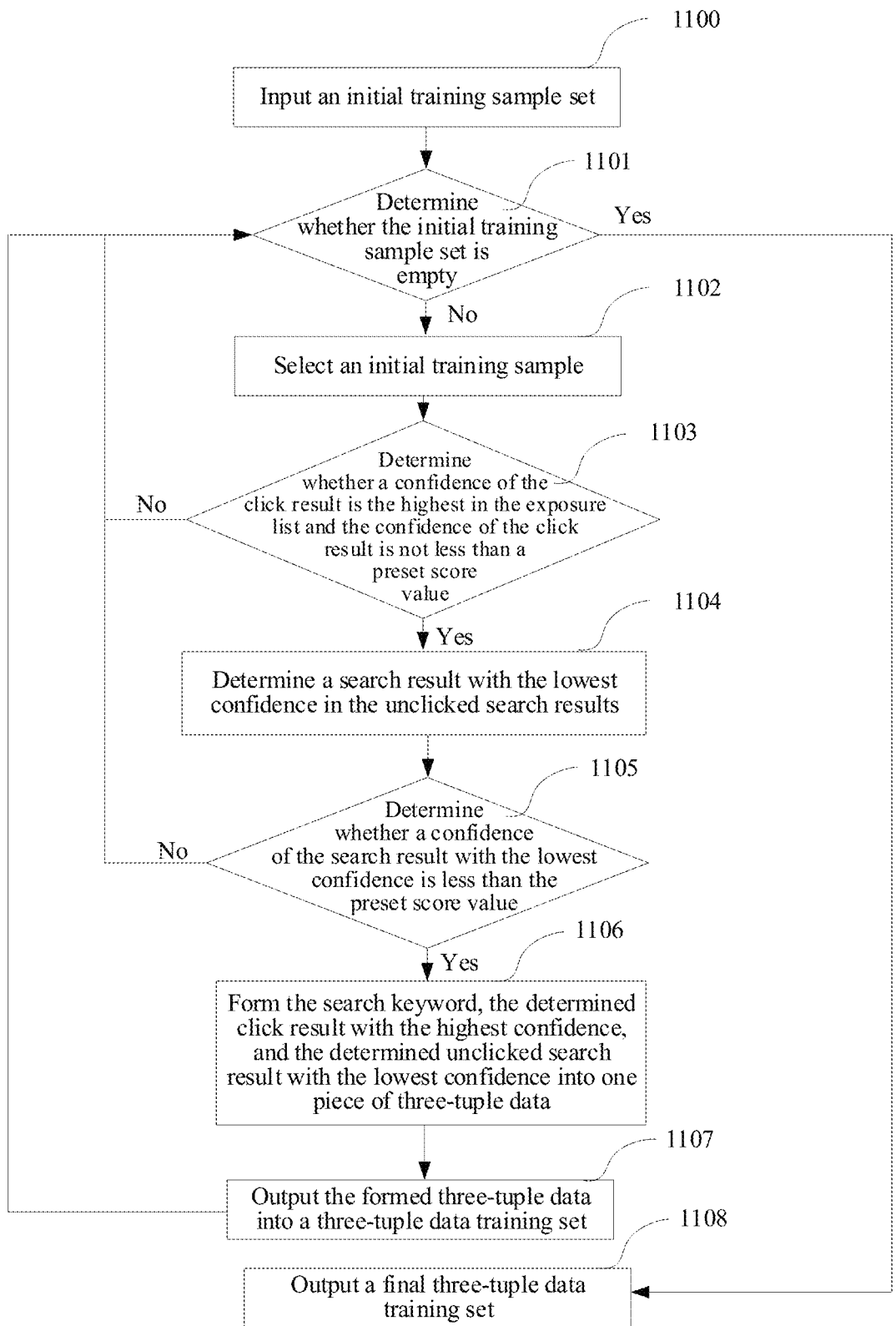
FIG. 11 is a flowchart of a method for constructing a three-tuple data training set according to an embodiment of this disclosure.

FIG. 11 is a flowchart of a method for constructing a three-tuple data training set according to an embodiment of this disclosure. The method includes the following steps:

Step 1100. Input an initial training sample set.

Step 1101. Determine whether the initial training sample set is empty. If the initial training sample set is empty, step 1008 is performed, or otherwise, step 1102 is performed.

Step 1102. Select an initial training sample.

That is, one initial training sample is selected from the initial training sample set each time for subsequent processing, and the initial training sample set is updated until all initial training samples are selected.

Step 1103. Determine whether a confidence of the click result is the highest in the exposure list and the confidence of the click result is not less than a preset score value. If the confidence of the click result is the highest in the exposure list and the confidence of the click result is not less than the preset score value, step 1104 is performed, or otherwise, step 1101 is performed.

The preset score value, for example, 1, may be set according to an actual case.

Step 1104. Determine a search result with the lowest confidence in the unclicked search results.

Step 1105. Determine whether a confidence of the search result with the lowest confidence is less than the preset score value. If the confidence of the search result with the lowest confidence is less than the preset score value, step 1106 is performed, or otherwise, step 1101 is performed.

Step 1106. Form the search keyword, the determined click result with the highest confidence, and the determined unclicked search result with the lowest confidence into one piece of three-tuple data.

Step 1107. Output the formed three-tuple data into a three-tuple data training set.

Step 1108. Output a final three-tuple data training set.

In this way, the similarity model is trained based on different training sample sets and optimization targets, so that the final trained similarity model can be applied in practice. For example, the trained similarity model may be provided for an online service applied to a scenario of sorting the search results. Specifically:

Step 1. Input a search keyword of a user and all returned search results.

Step 2. Sequentially input the search keyword and the search results into the similarity model, and respectively calculate similarities between the search keyword and the search results.

Step 3. Use a similarity result as a feature, provide the similarity result to a sorting model. Finally, the sorting model obtains a sorted search result at least according to the similarity result.

This is not limited to the sorting model. The sorting model may sort the search results sequentially in descending order of similarity, or may combine other features or factors simultaneously to finally obtain the sorted search results.

In this way, in this embodiment of this disclosure, the training samples of the similarity model are more reliable, training is performed based on the multi-target training manner, so that the obtained similarity model is more reliable. The similarity model algorithm combines the accurate matching and the semantic matching, and the semantic matching weight vector is set in consideration of different search needs, so that similarities calculated by the similarity model are more accurate. The search results based on the similarity sorting also better meet search needs of a user, so that the search results that rank in the top can better meet the needs of the user, thereby improving the search efficiency of the user and saving time.

Based on the foregoing embodiments, the following describes a specific application scenario of the embodiments. In this embodiment of this disclosure, the search result processing method may be applied to a vertical search in a "Search" function in WeChat®, for example, a scenario of an official account search in "Search". Herein, the Search function may allow a user to search for information such as Moments, articles, official accounts, novels, music, and stickers according to a search keyword.

Figure 12:
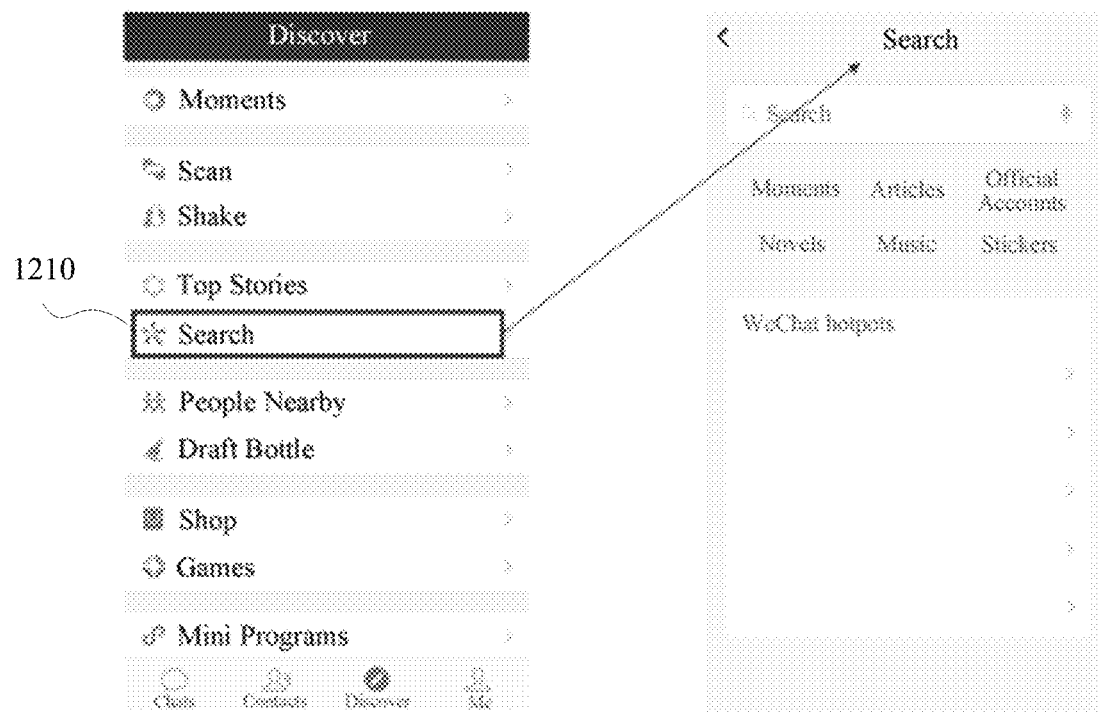
FIG. 12 is a schematic diagram of an interface of "Search" in a specific application scenario according to an embodiment of this disclosure.

FIG. 12 is a schematic diagram of an interface of "Search" in a specific application scenario according to an embodiment of this disclosure. The left figure shown in FIG. 12 is a schematic diagram of a main portal interface of "Search" in WeChat®. A user may open the WeChat® APP, and click the "Search" function 1210 to jump to an interface corresponding to "Search". The right figure shown in FIG. 12 is a schematic diagram of a main interface after "Search" 1210 is clicked. The user may input a search keyword in the main interface to search for information such as Moments, articles, and official accounts.

Figure 13:
FIG. 13 is a schematic diagram of a result display interface of "Search" in a specific application scenario according to an embodiment of this disclosure.

For example, FIG. 13 is a schematic diagram of a result display interface of "Search" in a specific application scenario according to an embodiment of this disclosure. The user inputs a search keyword "跳一跳" 1320 to obtain corresponding search results. As shown by the left figure in FIG. 12, a current search result type 1310 is provided in the box. "All" represents that various search result types are included. "Mini programs", "Official accounts", "Stickers" or the like respectively represents that only a single search result type is included, that is, a scenario of a vertical search. For a scenario of an official account search 1330, as shown in the right figure shown in FIG. 13, "Official accounts" is clicked to obtain search results 1340 about the official account of "跳一跳", and obtained search results 1340 are an exposure list.

In this scenario, the search needs of user include many aspects, and a final click behavior is also affected by many factors. How to accurately sort the search results returned for the search keyword and display the search results to the user is vital. Therefore, in this embodiment of this disclosure, similarities between the search keyword and the search results are calculated mainly by using the similarity model, and sorted is performed. The sorted search results are displayed, so that the search needs of user can be better mined. The search results that meet the search needs of the user rank higher in the final display to facilitate access of the user, thereby improving the efficiency.

Certainly, the scenario of a vertical search such as an official account search and a mini program search in "Search" in WeChat® is not limited in this embodiment of this disclosure, and other scenarios may be applied. For example, APP searches such as an official account search in QQ™, a Toutiao™ search in Jinri Toutiao™, a life account search and a mini program search in Alipay®, the Android® market on a mobile terminal, and an APP store, a video search on a video website and a short video APP. This is not limited in this embodiment of this disclosure.

Figure 14:
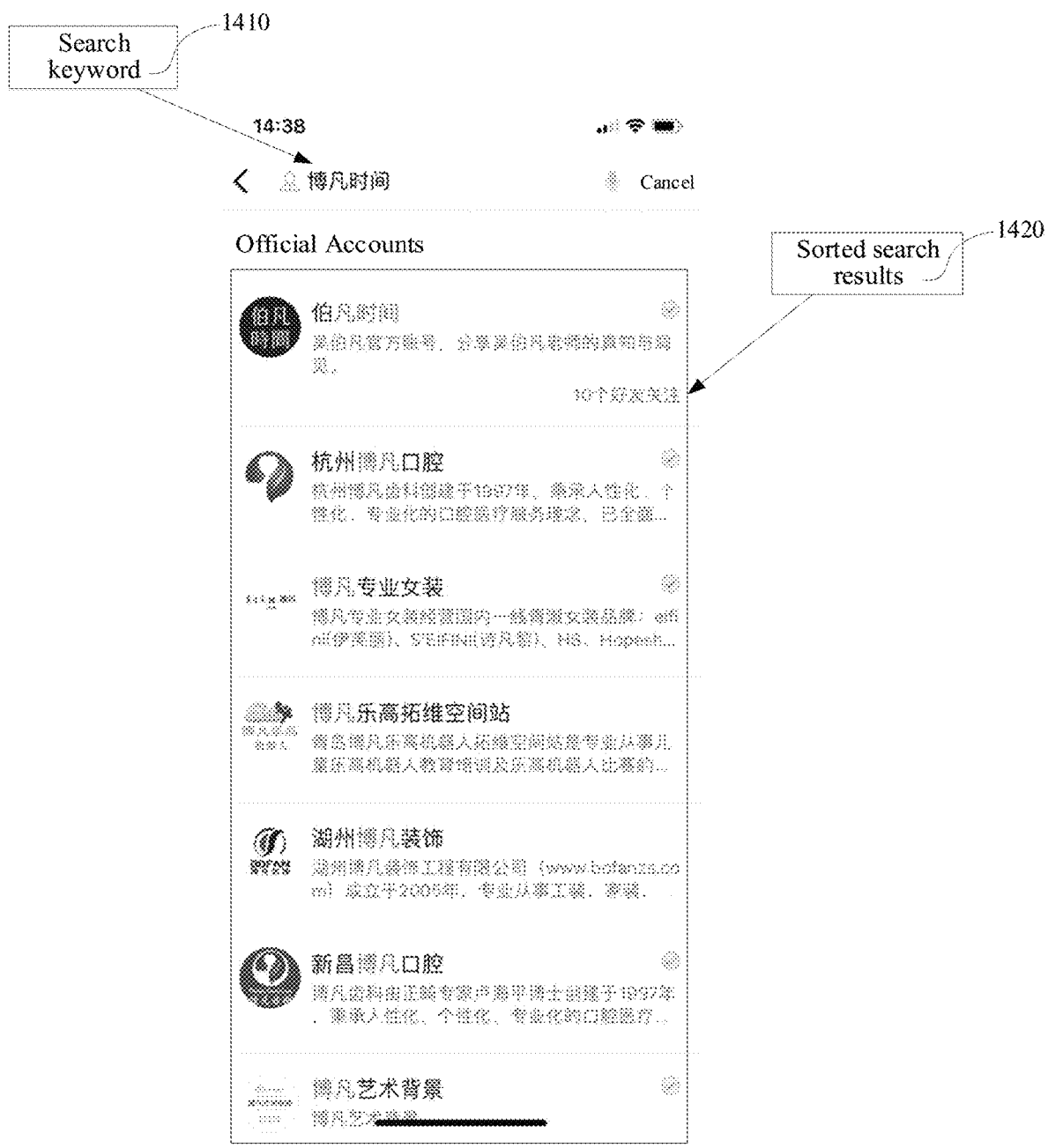
FIG. 14 is a schematic diagram of a display interface of sorted search results in a specific application scenario according to an embodiment of this disclosure.

Based on the foregoing embodiments, the following describes another specific application scenario of the embodiments. For example, FIG. 14 is a schematic diagram of a display interface of sorted search results in a specific application scenario according to an embodiment of this disclosure.

For example, the user performs a vertical search based on the "Search" function in the Wechat® APP. For example, in a scenario of an official account vertical search, the user intends to search for an official account " 博凡时闻 " but does not know specific characters or inputs incorrect characters. As shown in FIG. 14, when a search keyword " 博凡时闻 " 1410 is inputted, the search result processing method in this embodiment of this disclosure then processes the inputted search keyword 1410 and search results, to obtain similarities between the search results and the search keyword, sorts the search results, and sequentially displays the search results from top to bottom according to the sorted search results 1420. As shown in FIG. 14, based on the search result processing method in this embodiment of this disclosure, a search result that finally ranks in the top is " 博凡时闻 ". It indicates that even if a character of the search keyword of the user is inputted incorrectly, more similar search result can be adequately identified and displayed to the user. This has adequate fault tolerance, and the search results that rank in the top better meet the search needs of the user and are more accurate.

Compared with the conventional technology, a performance analysis is performed according to the method in the embodiments of this disclosure. For an interpretation recognition task, an objective is to determine whether two texts have the same meaning. Based on two different datasets, that is, a dataset 1 and a dataset 2, the accuracy of the matching between the search results and the search keyword and the index F1-score that measures the accuracy of the binary classification model are counted. Specific values are shown in Table 1 below. It can be learned that the method in the embodiments of this disclosure have significant improvements in both the accuracy and the F1-score for the two datasets.

TABLE 1

| | Dataset 1 | | Dataset 2 | |
| --- | --- | --- | --- | --- |
| Method | Accuracy of matching | F1-score | Accuracy of matching | F1-score |
| Conventional technology | 0.6975 | 0.7106 | 0.7264 | 0.7346 |
| The method in this embodiment of this disclosure | 0.8545 | 0.8498 | 0.8801 | 0.8820 |

For a question-answering task, an objective is to make documents that better conform to a question rank higher, and a measurement for performance evaluation includes: mean average precision (MAP), mean reciprocal rank (MRR), and normalized discounted cumulative gain (NDCG). The performance results for both the dataset 1 and the dataset 2 are shown in Table 2 below. It can be learned that the method in the embodiments of this disclosure has significant improvements in all three measurements for the two datasets. This proves that local interaction information is very significant for the short text matching.

TABLE 2

| | Dataset 1 | | | Dataset 2 | | |
| --- | --- | --- | --- | --- | --- | --- |
| Method | MAP | MRR | NDCG | MAP | MRR | NDCG |
| Conventional technology | 0.4873 | 0.4972 | 0.3197 | 0.4975 | 0.5466 | 0.3885 |
| The method in this embodiment of this disclosure | 0.6489 | 0.6613 | 0.5261 | 0.6607 | 0.7416 | 0.6163 |

In addition, for a search scenario of obtaining a short text by using a short search keyword, corresponding performance data is given in Table 3 below. It can be learned that, in both MAP and MRR measurements, the method in the embodiments of this disclosure can obtain an improvement of more than 45%, while in the NDCG measurement, the method in the embodiments of this disclosure can obtain an improvement of more than 70%.

TABLE 3

| Method | MAP | MRR | NDCG |
|---|---|---|---|
| Conventional technology | 0.3244 | 0.3257 | 0.1293 |
| The method in this embodiment of this disclosure | 0.5949 | 0.5965 | 0.4352 |
| Performance improvement ratio compared with the conventional technology | 45.47% | 45.40% | 70.29% |

Figure 15:
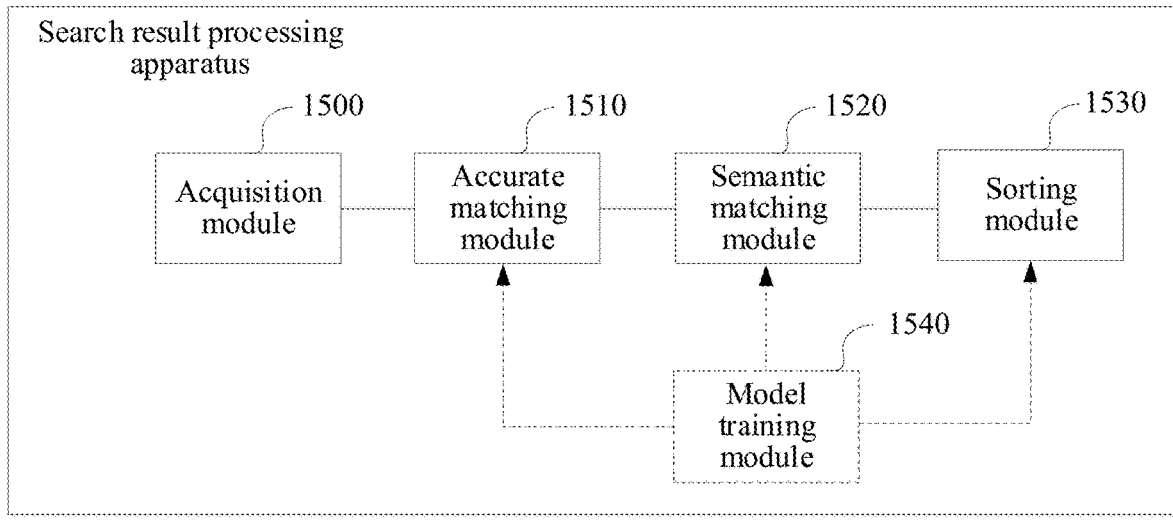
FIG. 15 is a schematic structural diagram of a search result processing apparatus according to an embodiment of this disclosure.

Based on the foregoing embodiments, referring to FIG. 15, in this embodiment of this disclosure, the search result processing apparatus specifically includes:

an acquisition module 1500, configured to acquire search results according to a search keyword;

an accurate matching module 1510, configured to obtain, for each search result, an accurate matching score of the search result;

a semantic matching module 1520, configured to: determine, for the each search result, a semantic matching weight vector of the search result and semantic representation vectors of the search keyword and the search result, and obtain a semantic matching score of the search result according to the semantic representation vectors and the semantic matching weight vector; and an obtaining module 1530, configured to obtain, for the each search result, a similarity between the search result and the search keyword according to the accurate matching score and the semantic matching score.

In another embodiment of this disclosure, the search result processing apparatus further includes:

a model training module 1540, configured to create and train a similarity model, the accurate matching module, the semantic matching module, and the obtaining module performing processing according to the similarity model obtained by using the model training module.

Figure 16:
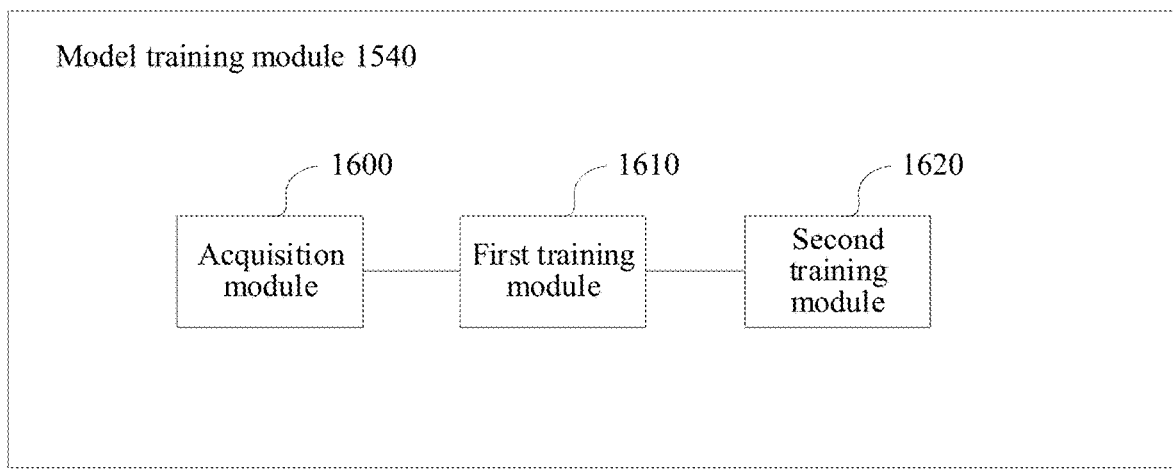
FIG. 16 is a schematic structural diagram of another search result processing apparatus according to an embodiment of this disclosure.

Referring to the structure of another search result processing apparatus in FIG. 16, the model training module 1540 includes:

an acquisition module 1600, configured to acquire an initial training sample set;

a first training module 1610, configured to: construct a two-tuple data training set according to the initial training sample set, and train an initialized similarity model according to the two-tuple data training set, to obtain a trained first similarity model; and a second training module 1620, configured to: construct a three-tuple data training set according to the initial training sample set, and train the first similarity model according to the three-tuple data training set, to obtain a trained second similarity model.

Figure 17:
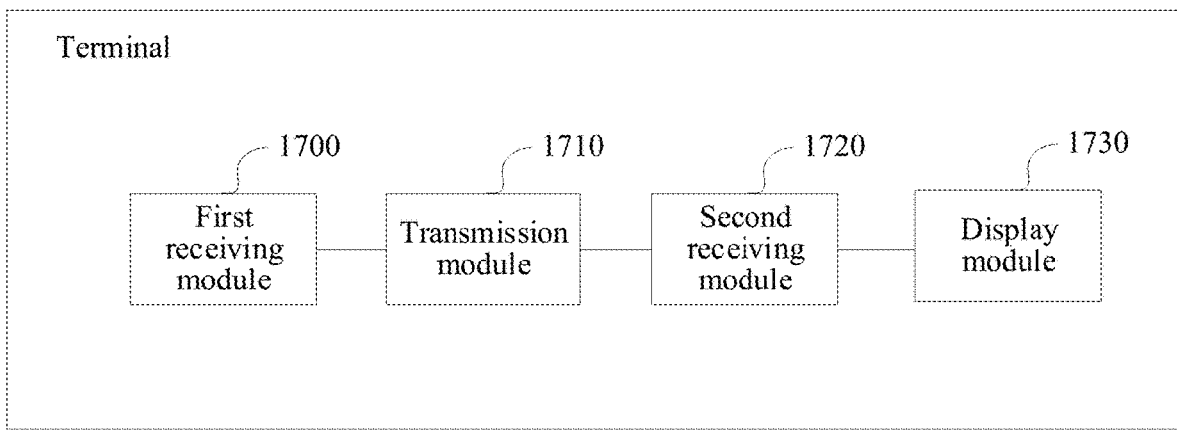
FIG. 17 is a schematic structural diagram of a terminal according to an embodiment of this disclosure.

Based on the foregoing embodiments, FIG. 17 is a schematic structural diagram of a terminal according to an embodiment of this disclosure. The terminal specifically includes:

a first receiving module 1700, configured to receive an inputted search keyword;

a transmission module 1710, configured to: transmit the received search keyword to a server, causing the server to perform any search result processing method in the foregoing, to obtain similarities between search results and the search keyword, and obtain sorted search results according to the similarities between the search results and the search keyword;

a second receiving module 1720, configured to receive the sorted search results returned by the server; and a display module 1730, configured to display the sorted search results.

The term module may refer to a software module, a hardware module, or a combination thereof. A software module may be a computer program or part of a computer program that has a predefined function and works together with other related parts to achieve a predefined goal, such as those functions and goals described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module.

Figure 18:
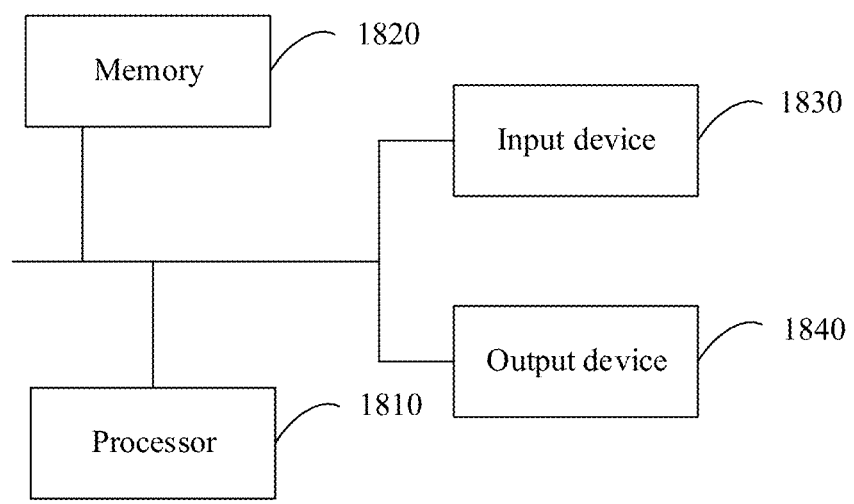
FIG. 18 is a schematic structural diagram of an electronic device according to an embodiment of this disclosure.

Based on the foregoing embodiments, FIG. 18 is a schematic structural diagram of an electronic device according to an embodiment of this disclosure.

An embodiment of this disclosure provides an electronic device. The electronic device may include a central processing unit (CPU) 1810, a memory 1820, an input device 1830, an output device 1840, and the like. The memory 1820 may include a read-only memory (ROM) and a random access memory (RAM), and provide program instructions and data stored in the memory 1820 for the processor 1810. In this embodiment of this disclosure, the memory 1820 may be configured to store a program of a training sample generation method according to the embodiments of this disclosure. The processor 1810 invokes the program instructions stored in the memory 1820, and the processor 1810 is configured to perform any search result processing method in the embodiments of this disclosure according to the obtained program instructions.

Based on the foregoing embodiments, the embodiments of this disclosure provide a computer-readable storage medium, storing a computer program, the computer program, when executed by a processor, implementing the search result processing method according to any method embodiments described above.

A person skilled in the art is to understand that the embodiments of this disclosure may be provided as a method, a system, or a computer program product. Therefore, this disclosure may take the form of total hardware embodiments, total software embodiments, or embodiments combining software and hardware. In addition, this disclosure may use a form of a computer program product that is implemented on one or more computer-usable storage media (including but not limited to a disk memory, a compact disc read-only memory (CD-ROM) and an optical memory) that include computer-usable program code.

This disclosure is described with reference to flowcharts and/or block diagrams of the method, the device (system), and the computer program product in the embodiments of this disclosure. It is to be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer program memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this disclosure without departing from the spirit and scope of the embodiments of this disclosure. In this way, if these modifications and variations made to the embodiments of this disclosure fall within the scope of the claims of this disclosure and equivalent technologies thereof, this disclosure also intends to include these changes and variations.

What is claimed is:

1. A method for processing a search result, performed by an electronic device, comprising:
   acquiring a plurality of search results according to a search keyword;
   for each of the plurality of search results, executing a similarity model with the search result and the search keyword as inputs to evaluate a similarity between the search result and the search keyword by:
      obtaining, with the similarity model, an accurate matching metric indicating accurate matching degree of the search result relative to the search keyword,
      determining, with the similarity model, a semantic matching weight vector of the search result, a semantic representation vector of the search keyword, and a semantic representation vector of the search result,
      obtaining, with the similarity model, a semantic matching metric indicating semantic matching degree of the search result relative to the search keyword according to the semantic representation vector and the semantic matching weight vector,
      outputting, with the similarity model, a similarity metric between the search result and the search keyword according to the accurate matching metric and the semantic matching metric, wherein the similarity model is a machine learning model trained to evaluate a similarity between a search result and a search keyword; and
   processing the plurality of search results based on the similarity metric output between the plurality of search results and the search keyword to output a processing result.

2. The method of claim 1, wherein obtaining the accurate matching metric of the search result comprises:
   respectively obtaining a word segmentation result corresponding to the search keyword and a word segmentation result corresponding to the search result by multi-granularity word segmentation;
   performing accurate matching between the word segmentation result corresponding to the search keyword and the word segmentation result corresponding to the search result, to obtain an interaction matrix between the search keyword and the search result;
   obtaining an interaction feature between the search keyword and the search result, according to the interaction matrix and a relative position relationship between word segments in the word segmentation result corresponding to the search keyword and the word segmentation result corresponding to the search result; and
   obtaining the accurate matching metric of the search result according to the interaction feature.

3. The method of claim 2, wherein obtaining the accurate matching metric of the search result according to the interaction feature comprises:
   inputting the interaction feature into a pre-trained first convolutional network, to obtain a convolutional feature outputted by the first convolutional network performing feature extraction on the interaction feature; and
   inputting the convolutional feature into a pre-trained first fully-connected network, to obtain a one-dimensional vector outputted by the first fully-connected network, the one-dimensional vector serving as the accurate matching metric of the search result.

4. The method of claim 2, wherein determining the semantic matching weight vector of the search result comprises:
   inputting the interaction matrix into a pre-trained second convolutional network, to obtain a convolutional feature outputted by the second convolutional network performing feature extraction on the interaction matrix; and
   inputting the convolutional feature into a pre-trained second fully-connected network, to obtain a preset-dimensional vector outputted by the second fully-connected network, the preset-dimensional vector serving as the semantic matching weight vector.

5. The method of claim 1, wherein determining the semantic representation vector of the search keyword and the semantic representation vector of the search result comprises:
   respectively obtaining a word segmentation result corresponding to the search keyword and a word segmentation result corresponding to the search result by multi-granularity word segmentation;
   obtaining a first word vector of each word segment in the word segmentation result corresponding to the search keyword according to a preset word vector model;
   obtaining a word representation matrix of the search keyword according to the first word vector;
   inputting the word representation matrix of the search keyword into a pre-trained third convolutional network to output a first convolutional feature corresponding to the word representation matrix of the search keyword;

inputting the first convolutional feature into a pre-trained third fully-connected network to output a first preset-dimensional vector as the semantic representation vector of the search keyword; and obtaining a second word vector of each word segment in the word segmentation result corresponding to the search result according to the word vector model;

obtaining a word representation matrix of the search result according to the second word vector;

inputting the word representation matrix of the search result into the third convolutional network to output a second convolutional feature corresponding to the word representation matrix of the search result; and inputting the second convolutional feature into the third fully-connected network to output a second preset-dimensional vector as the semantic representation vector of the search result.

6. The method of claim 5, wherein respectively obtaining the word segmentation result corresponding to the search keyword and the word segmentation result corresponding to the search result by multi-granularity word segmentation comprises:

identifying a high-frequency word in response to the search keyword and the search result comprise the high-frequency word listed in a preset high-frequency word set; and dividing remaining parts of the search keyword and the search result by word, to respectively obtain the word segmentation result corresponding to the search keyword and the word segmentation result corresponding to the search result.

7. The method of claim 1, wherein obtaining the semantic matching metric of the search result according to the semantic representation vectors and the semantic matching weight vector comprises:

concatenating the semantic representation vector of the search keyword and the semantic representation vector of the search result, to obtain a concatenated semantic representation vector; and performing a dot product operation on the concatenated semantic representation vector and the semantic matching weight vector of the search result, to obtain the semantic matching metric of the search result.

8. The method of claim 1, further comprising:

creating and training the similarity model; and inputting the search keyword and the search result into the trained similarity model to output a similarity metric between the search result and the search keyword.

9. The method of claim 8, wherein training the similarity model comprises:

acquiring an initial training sample set;

constructing a two-tuple data training set according to the initial training sample set;

training an initialized similarity model according to the two-tuple data training set, to obtain a trained first similarity model;

constructing a three-tuple data training set according to the initial training sample set; and training the first similarity model according to the three-tuple data training set, to obtain a trained second similarity model.

10. The method of claim 9, wherein acquiring the initial training sample set comprises:

acquiring an original search click record set according to a search click behavior of a user; and filtering the original search click record set according to a preset rule, to obtain the initial training sample set.

11. The method of claim 9, wherein each two-tuple data in the two-tuple data training set comprises at least a search keyword, a search result, and a label representing whether the search keyword is similar to the search result.

12. The method of claim 9, wherein each three-tuple data in the three-tuple data training set comprises at least a search keyword, a first search result, and a second search result, and a similarity between the search keyword and the first search result is greater than a similarity between the search keyword and the second search result.

13. The method of claim 9, wherein each training sample in the initial training sample set comprises at least a search keyword, an exposure list, and a click result, the exposure list being a list comprising a plurality of search results, the click result being a clicked search result; and constructing the two-tuple data training set according to the initial training sample set comprises:

determining unclicked search results according to the exposure list; and for each initial training sample in the initial training sample set, in response to a text matching similarity between the click result and the search keyword being greater than a first preset threshold, determining a search result whose text matching similarity with the search keyword is not less than a second preset threshold in the unclicked search results, and filtering out the determined search result from the unclicked search results;

forming the search keyword and the click result into a positive sample pair in response to the filtered unclicked search results being not empty;

randomly selecting a search result from the filtered unclicked search results, and forming the search keyword and the randomly selected search result into a negative sample pair; and constructing the two-tuple data training set according to respective positive sample pairs and negative sample pairs corresponding to the initial training sample set.

14. The method of claim 9, wherein each training sample in the initial training sample set comprises at least a search keyword, an exposure list, and a click result, the exposure list is a list comprising a plurality of search results, the click result is a clicked search result; and constructing a three-tuple data training set according to the initial training sample set comprises:

for each initial training sample in the initial training sample set:

determining confidences of search results in an exposure list corresponding to the initial training sample;

in response to a confidence of a click result being higher than confidences of all other search results in the exposure list, the confidence of the click result being not less than a preset metric value, and a confidence of a unclicked search result with the lowest confidence in the unclicked search results being less than the preset metric value, forming the search keyword, the click result, and the unclicked search result with the lowest confidence into a three-tuple data; and constructing the three-tuple data training set according to the three-tuple data corresponding to initial training samples.

15. An apparatus for processing search result, comprising:
a memory operable to store program code; and
a processor operable to read the program code and configured to execute the program code to:
   acquire a plurality of search results according to a search keyword;
   for each of the plurality of search results, execute a similarity model with the search result and the search keyword as inputs to evaluate a similarity between the search result and the search keyword by:
      obtaining, with the similarity model, an accurate matching metric indicating accurate matching degree of the search result relative to the search keyword;
      determining, with the similarity model, a semantic matching weight vector of the search result, a semantic representation vector of the search keyword, and a semantic representation vector of the search result;
      obtaining, with the similarity model, a semantic matching metric indicating semantic matching degree of the search result relative to the search keyword according to the semantic representation vectors and the semantic matching weight vector;
      outputting, with the similarity model, a similarity metric between the search result and the search keyword according to the accurate matching metric and the semantic matching metric, wherein the similarity model is a machine learning model trained to evaluate a similarity between a search result and a search keyword; and
   process the plurality of search results based on the similarity metric output between the plurality of search results and the search keyword to output a processing result.

16. The apparatus of claim 15, wherein the processor is further configured to:
   respectively obtain a word segmentation result corresponding to the search keyword and a word segmentation result corresponding to the search result by multi-granularity word segmentation;
   perform accurate matching between the word segmentation result corresponding to the search keyword and the word segmentation result corresponding to the search result, to obtain an interaction matrix between the search keyword and the search result;
   obtain an interaction feature between the search keyword and the search result according to the interaction matrix and a relative position relationship between word segments in the word segmentation result corresponding to the search keyword and the word segmentation result corresponding to the search result; and
   obtain the accurate matching metric of the search result according to the interaction feature.

17. The apparatus of claim 16, wherein the processor is further configured to:
   input the interaction matrix into a pre-trained second convolutional network, to obtain a convolutional feature outputted by the second convolutional network performing feature extraction on the interaction matrix; and
   input the convolutional feature into a pre-trained second fully-connected network, to obtain a preset-dimensional vector outputted by the second fully-connected network, the preset-dimensional vector serving as the semantic matching weight vector.

18. The apparatus of claim 15, wherein the processor is configured to:
   respectively obtain a word segmentation result corresponding to the search keyword and a word segmentation result corresponding to the search result by multi-granularity word segmentation;
   obtain a first word vector of each word segment in the word segmentation result corresponding to the search keyword according to a preset word vector model;
   obtain a word representation matrix of the search keyword according to the first word vector;
   input the word representation matrix of the search keyword into a pre-trained third convolutional network to output a first convolutional feature corresponding to the word representation matrix of the search keyword;
   input the first convolutional feature into a pre-trained third fully-connected network to output a first preset-dimensional vector as the semantic representation vector of the search keyword; and
   obtain a second word vector of each word segment in the word segmentation result corresponding to the search result according to the word vector model;
   obtain a word representation matrix of the search result according to the second word vector;
   input the word representation matrix of the search result into the third convolutional network to output a second convolutional feature corresponding to the word representation matrix of the search result; and
   input the second convolutional feature into the third fully-connected network to output a second preset-dimensional vector as the semantic representation vector of the search result.

19. The apparatus of claim 15, wherein the processor is further configured to:
   create and train the similarity model; and
   input the search keyword and the search result into the trained similarity model to output a similarity metric between the search result and the search keyword.

20. A non-transitory machine-readable storage medium, having processor executable instructions stored thereon for causing a processor to:
   acquire a plurality of search results according to a search keyword;
   for each of the plurality of search results, execute a similarity model with the search result and the search keyword as inputs to evaluate a similarity between the search result and the search keyword by:
      obtaining, with the similarity model, an accurate matching metric indicating accurate matching degree of the search result relative to the search keyword;
      determining, with the similarity model, a semantic matching weight vector of the search result, a semantic representation vector of the search keyword, and a semantic representation vector of the search result;
      obtaining, with the similarity model, a semantic matching metric indicating semantic matching degree of the search result relative to the search keyword according to the semantic representation vectors and the semantic matching weight vector; and
      outputting, with the similarity model, a similarity metric between the search result and the search keyword according to the accurate matching metric and the semantic matching metric, wherein the similarity model is a machine learning model trained to evaluate a similarity between a search result and a search keyword; and process the plurality of search results based on the similarity metric output between the plurality of search results and the search keyword to output a processing result.

* * * * *